United States Patent [19]

Yoshida et al.

[11] Patent Number: 5,050,228
[45] Date of Patent: Sep. 17, 1991

[54] APPARATUS FOR CONVERTING IMAGE OUTLINE DATA INTO DOT DATA REPRESENTATIVE OF IMAGE DOTS

[75] Inventors: Hitoshi Yoshida, Kohnan; Takahiro Kanegae, Nagoya; Naoyuki Kawamoto, Toki, all of Japan

[73] Assignee: Brother Kogyo Kabushiki Kaisha, Aichi, Japan

[21] Appl. No.: 486,225

[22] Filed: Feb. 28, 1990

[30] Foreign Application Priority Data

Mar. 4, 1989 [JP] Japan .................................. 1-52524
Mar. 7, 1989 [JP] Japan .................................. 1-54577

[51] Int. Cl.$^5$ .............................................. G06K 9/36
[52] U.S. Cl. ....................................... 382/55; 340/731
[58] Field of Search ................... 382/24, 55; 340/728, 340/731

[56] References Cited

U.S. PATENT DOCUMENTS

| | | | |
|---|---|---|---|
| 3,582,887 | 6/1971 | Guthrie | 382/55 |
| 3,668,638 | 6/1972 | Iijima et al. | 382/55 |
| 3,740,743 | 6/1973 | Baron | 340/709 |
| 3,930,251 | 12/1975 | Salava et al. | 364/523 |
| 3,999,168 | 12/1976 | Findley et al. | 340/731 |
| 4,331,955 | 5/1982 | Hansen | 340/728 |
| 4,897,638 | 1/1990 | Kokunishi et al. | 340/731 |

FOREIGN PATENT DOCUMENTS

87/04835 8/1987 World Int. Prop. O. .

Primary Examiner—Leo H. Boudreau
Assistant Examiner—David Fox
Attorney, Agent, or Firm—Oliff & Berridge

[57] ABSTRACT

A data converting apparatus for converting outline data representative of an outline of a character, into dot data including dot-forming bits each indicative of the presence of an image dot to be formed at a position of a corresponding dot-forming picture element which lies within the outline of each stroke of the character, so as to satisfy a predetermined requirement, when the outline of the character is superimposed on a pixel screen wherein picture elements are defined by x-axis pixel lines and y-axis pixel lines perpendicular to the x-axis pixel lines. The apparatus includes a device for determining whether or not a difference between an outline width of each character stroke as defined by the outline data and a reproduction width of the as reproduced according to the dot data as normally prepared based on the outline data exceeds a reference value. The normally prepared dot data are changed so as to reduce the difference between the outline and reproduction widths, if the difference exceeds the reference value.

14 Claims, 20 Drawing Sheets

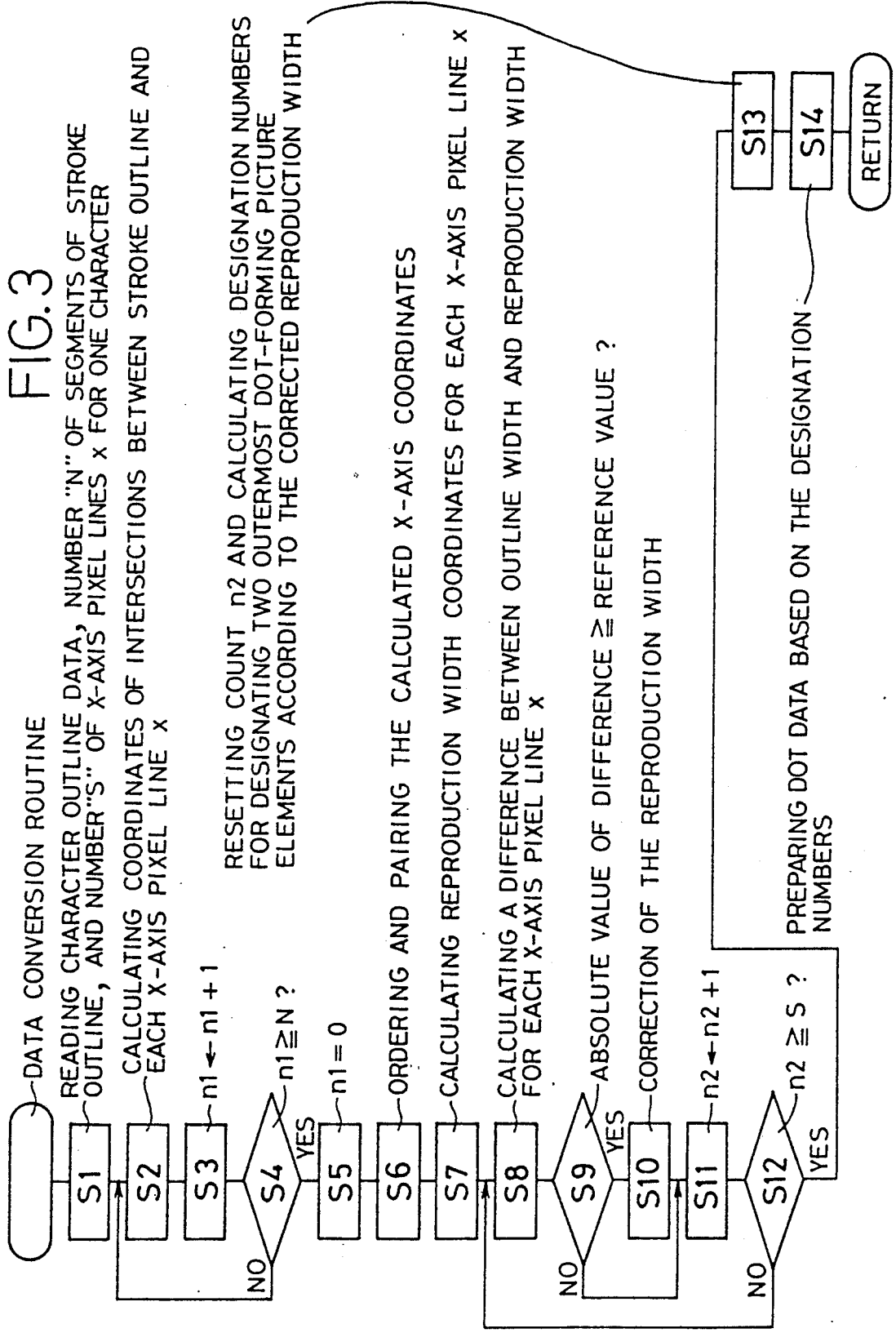

FIG.7

| Y-AXIS COORDINATES OF PIXEL LINES x | X-AXIS COORDINATE VALUES |
|---|---|
| 25 | |
| 75 | 230 , 390 |
| 125 | 210 , 360 |
| 175 | 190 , 330 |
| 225 | 180 , 315 |
| 275 | 165 , 300 |
| 325 | 140 , 280 |
| 375 | |
| .... | .... |

FIG. 8

| Y-AXIS COORDINATES OF PIXEL LINES x | X-AXIS COORDINATE VALUES |
|---|---|
| 25 | |
| 75 | 250 , 400 |
| 125 | 200 , 350 |
| 175 | 200 , 350 |
| 225 | 200 , 300 |
| 275 | 150 , 300 |
| 325 | 150 , 300 |
| 375 | |
| .... | .... |

FIG.9

| IDENTIFICATION NUMBER OF PIXEL LINES x | DESIGNATION NUMBERS OF TWO OUTERMOST PICTURE ELEMENTS |
|---|---|
| 0 | |
| 1 | 5 , 7 |
| 2 | 4 , 6 |
| 3 | 4 , 6 |
| 4 | 3 , 5 |
| 5 | 3 , 5 |
| 6 | 3 , 5 |
| 7 | |
| .... | .... |

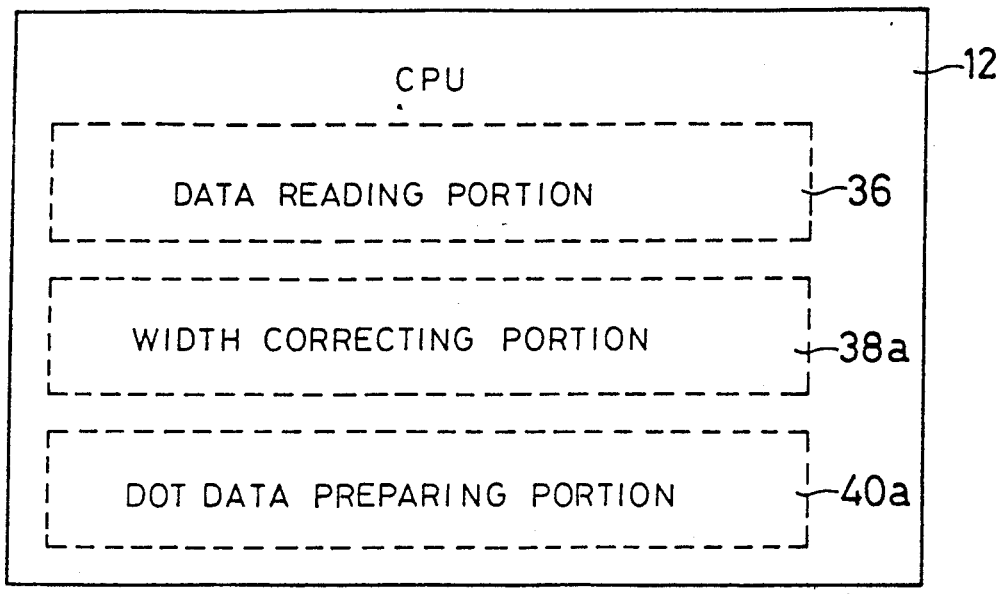
FIG.16
FIG.18
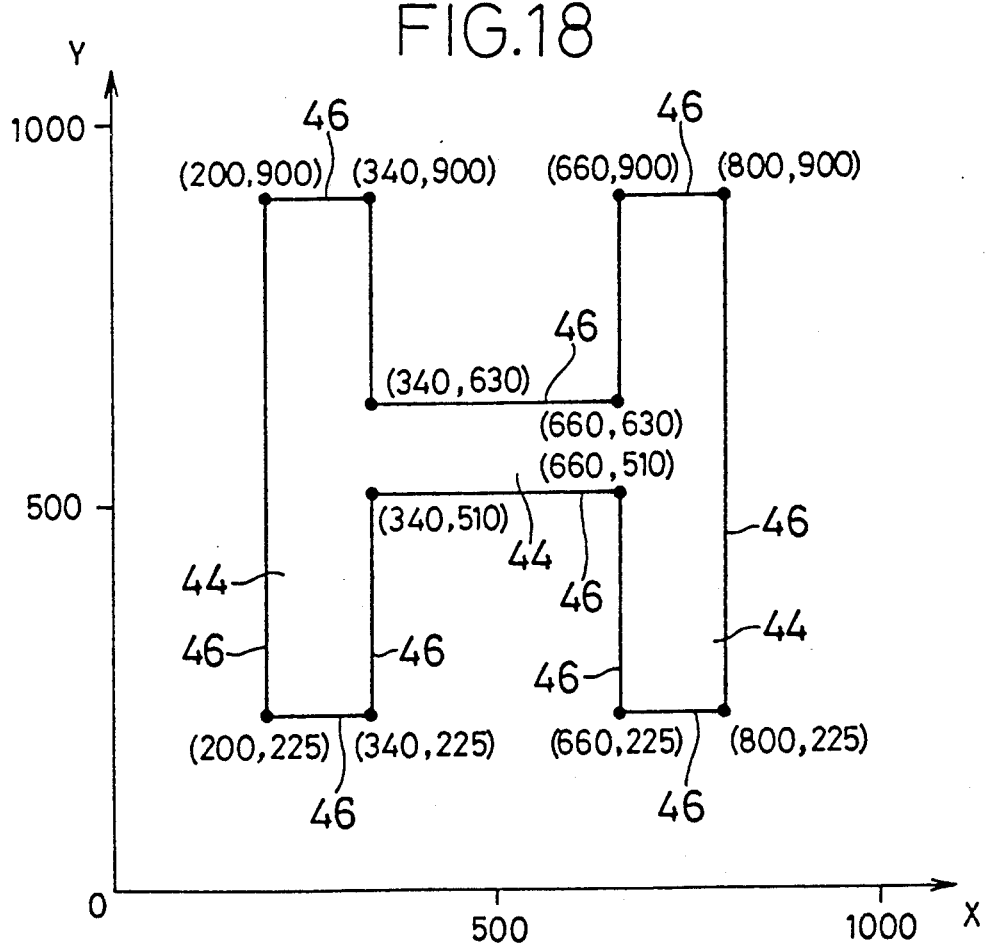

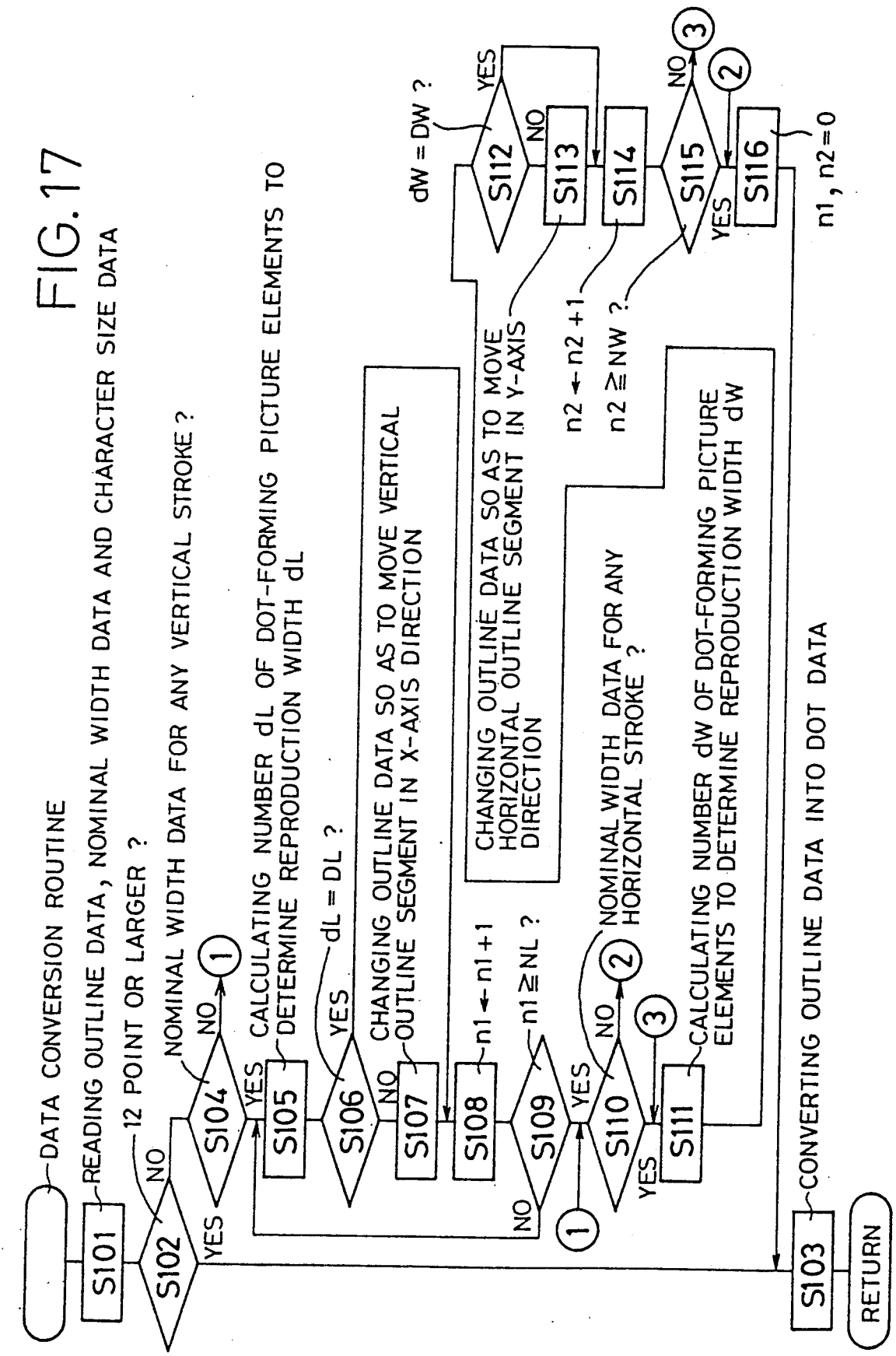

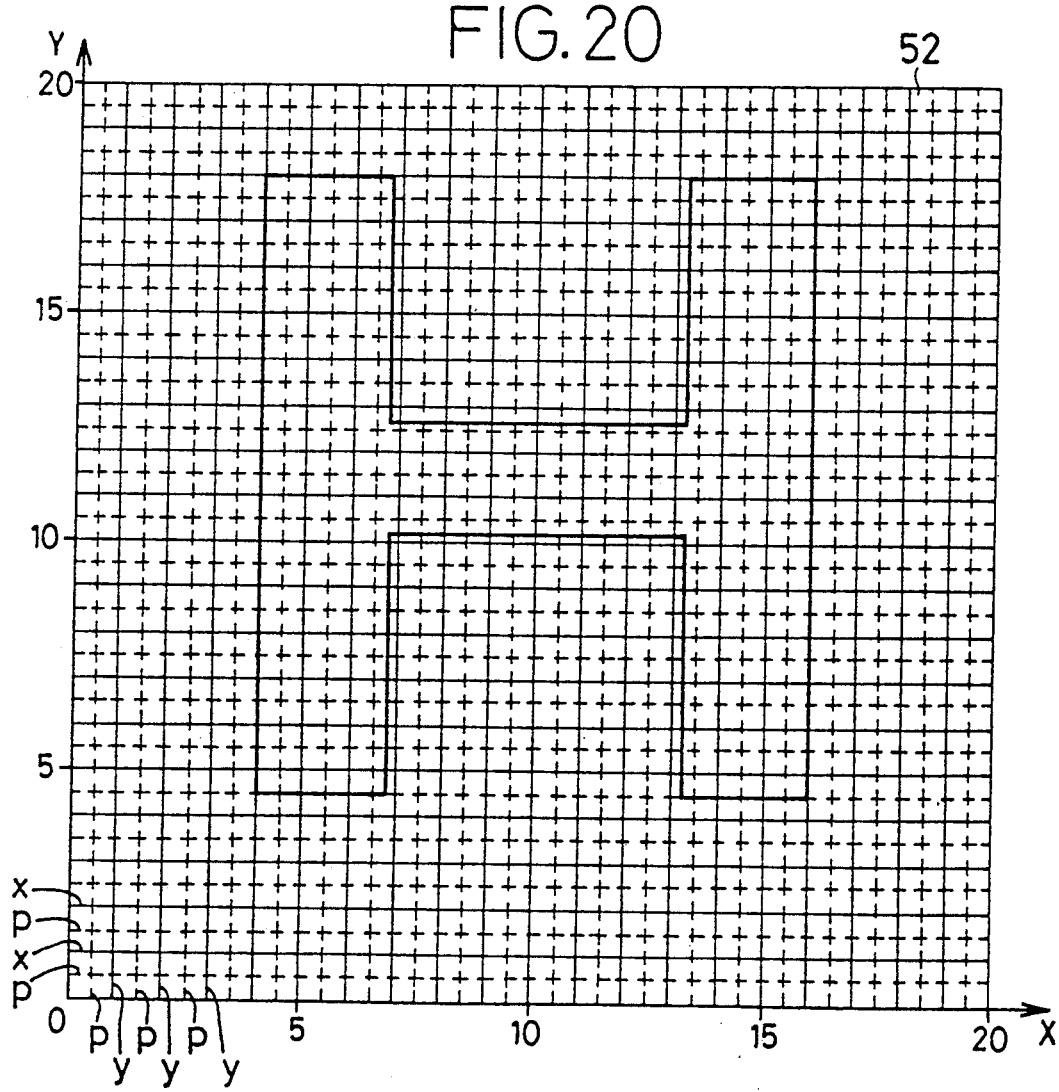

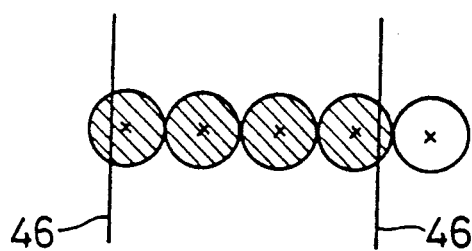
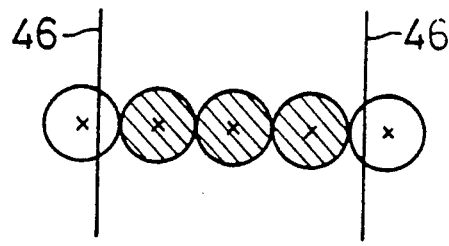
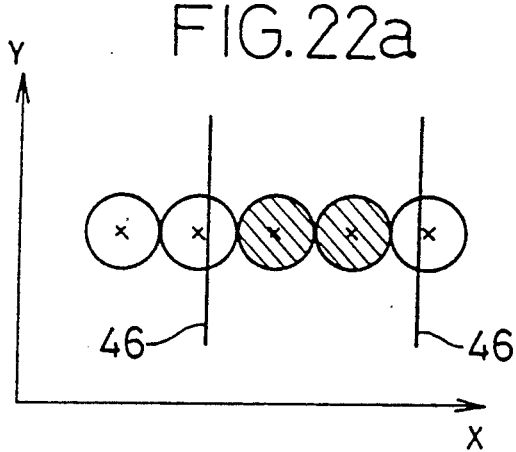
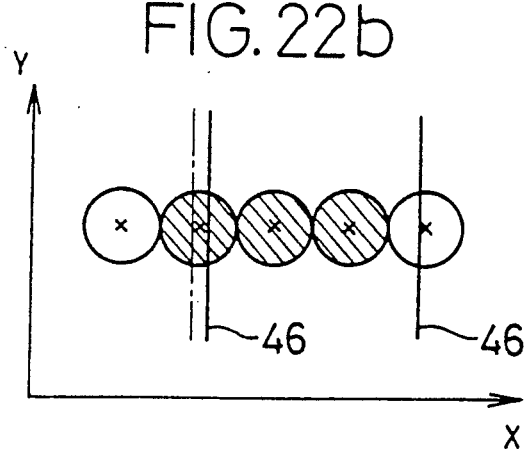
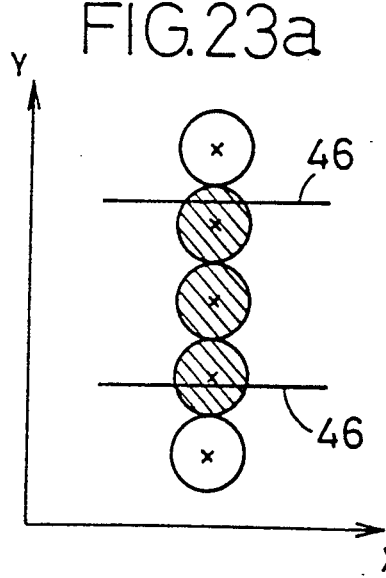
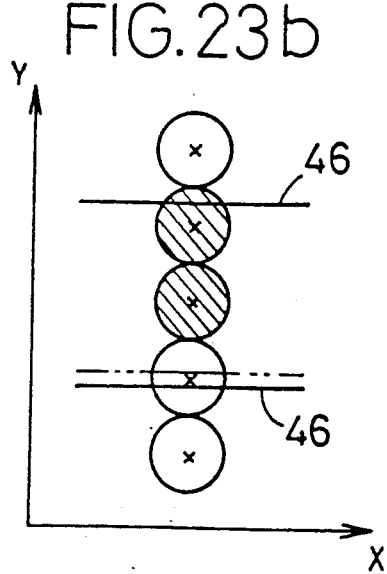

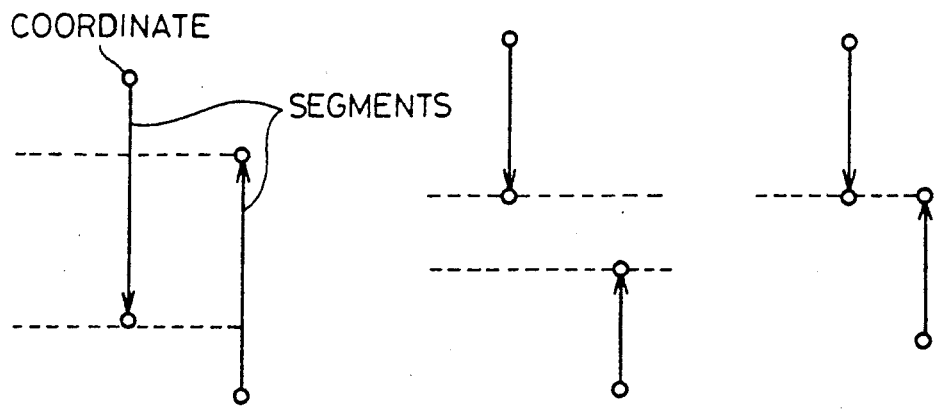
FIG. 28
FIG. 29
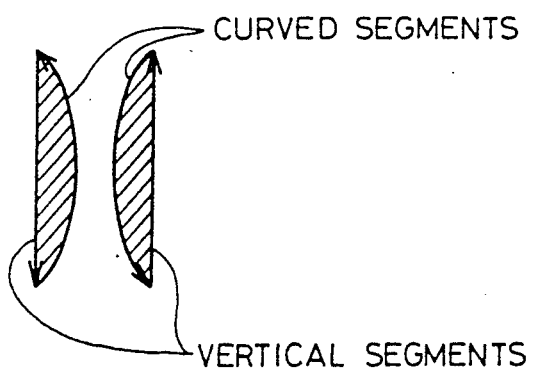
FIG. 30
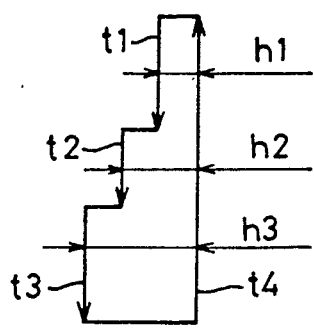

APPARATUS FOR CONVERTING IMAGE OUTLINE DATA INTO DOT DATA REPRESENTATIVE OF IMAGE DOTS

BACKGROUND OF THE INVENTION

1. Field of the Invention

The present invention relates in general to an apparatus for converting outline data representative of a visible representation such as letters, symbols and other characters, into dot data representative of image dots to be formed to reproduce the visible representation. More particularly, the present invention is concerned with a technique for assuring accurate control of the width of each stroke or segment of the reproduced visible representation.

2. Discussion of the Prior Art

Visible representations such as letters, numerals, symbols and other characters or graphical representations are printed, displayed or otherwise reproduced according to image data suitably processed by a computer. Commonly, the image data take the form of dot data consisting of bits indicative of whether image dots are to be formed at respective picture elements which are the smallest part of picture image and which determine the resolution of the reproduced visible representation. If a batch of dot data representative of all the visible representations available for reproduction is prepared and stored in an image data memory, the memory should have a considerably large storage capacity. In this respect, it is desirable to store a batch of outline data representative of the outlines of the characters and other visible representations, and convert the outline data into the corresponding dot data by suitable data converting means, when the visible representations are printed, displayed or otherwise reproduced, as disclosed in Japanese Patent Publication No. 53-41017.

In the data converting means disclosed in the above publication, the outline data is defined in a coordinate system in which the picture elements are defined by a plurality of parallel pixel lines parallel to an X axis, and a plurality of parallel pixel lines parallel to a Y axis perpendicular to the X axis. For example, the outline of a character is superimposed on a coordinated pixel screen, and the dot data of the character represented by the outline data are prepared such that the logical values of the bits of the dot data indicate the presence of image dots at the picture elements which lie within the outline of the character according to a predetermined requirement.

Where characters are reproduced according to the dot data prepared by conversion from the corresponding outline data, for example, the number and positions of the picture elements which lie within the outline of a given stroke of a character so as to meet the predetermined requirement may vary, depending upon the position at which the character represented by the outline data is positioned relative to the coordinated pixel screen, i.e., depending upon the position at which the character is printed, displayed or otherwise reproduced. Further, the number and positions of the picture elements which lie over the width of a given stroke of a character may vary, depending upon the position at which the stroke represented by the outline data is positioned relative to the coordinated pixel screen. When the outline of each character is designed by a designer, the width of each stroke of the character is determined by two segments of the outline of the stroke, so as to give the character a good appearance. If the number of the image dots corresponding to the width of the stroke as defined by the outline data varies for the reason stated above, the width of the stroke as reproduced according to the dot data may differ from the nominal value defined by the two segments of the outline of the stroke represented by the outline data. In this case, the reproduced character has a poor appearance. In the case of a character stroke which is curved, or inclined with respect to the X and Y axes of the pixel screen, the width of the stroke as reproduced tends to differ from one portion of the stroke to another, because the number of the picture elements which lie within the width of the stroke superimposed on the pixel screen varies at different local portions of the stroke.

SUMMARY OF THE INVENTION

It is therefore an object of the present invention to provide a data converting apparatus capable of converting outline data into dot data, so that the width of each stroke of a visible representation as reproduced according to the dot data is substantially equal or sufficiently close to the nominal width as defined by the outline data.

The above object may be achieved according to the principle of the present invention, which provides a data converting apparatus for converting a batch of outline data representative of an outline of a character having at least one stroke, into a batch of dot data which include dot-forming bits each indicative of the presence of an image dot to be formed at a position of a corresponding dot-forming picture element which lies within the outline of each stroke so as to satisfy a predetermined requirement, when the outline of the character is superimposed on a coordinated pixel screen wherein picture elements are defined by a plurality of parallel x-axis pixel lines and a plurality of parallel y-axis pixel lines perpendicular to the x-axis pixel lines, wherein the improvement comprises determing means for determining whether or not a difference between an outline width of each stroke of the character as defined by the outline data and a reproduction width of the each stroke as reproduced according to the dot data as normally prepared based on the outline data exceeds a predetermined reference value, and data changing means for changing the normally prepared dot so as to reduce the difference between the outline and reproduction widths, if the determining means determines that the difference exceeds the reference value.

The nominal or outline width of each stroke of a character is determined by appropriate two segments of the outline of the stroke as defined by outline data of the character, so that the stroke has a good appearance. On the other hand, the reproduction width of the stroke is determined by the number of image dots to be formed according to the dot data at the positions of dot-forming picture elements which lie within the outline of the stroke. Generally, however, the reproduction width tends to differ from the nominal width, depending upon the selected size and the printing position of the character. To reduce or eliminate the difference between the reproduction width and the nominal outline width, in the data converting apparatus constructed according to the present invention as described above, the dot data corresponding to the outline data are changed or modified so as to reduce the difference, if the difference exceeds the predetermined value. As a result, the reproduction width determined by the number of the successive image dots formed in the direction of the width can be made equal or considerably close to the nominal width.

In one form of the present invention, the determining means determines as the nominal outline width a first distance between the two segments of the outline of the stroke, and as the reproduction width a second distance over which the image dots are to be successively formed according to the dot-forming bits of the normally prepared dot data, and the determining means compares these first and second distances with each other to determine the difference. The data changing means may be adapted to include width correcting means for effecting at least one of a first data changing operation and a second data changing operation. The first data changing operation is effected to increase the number of the dot-forming bits corresponding to the dot-forming picture elements to be successively formed to define the reproduction width, if the outline width is larger than the reproduction width by a first predetermined amount or larger. The second data changing operation is effected to decrease the number of the dot-forming bits to be successively formed, if the reproduction width is larger than the outline width by a second predetermined amount or larger, which may be the same as or different from the first predetermined amount. In this case, the determining means may further includes means for calculating as the outline width a distance between coordinates of a pair of intersections between the two segments of the outline of the stroke and each of at least one of the plurality of parallel x-axis pixel lines and the plurality of parallel y-axis pixel lines. The determining means may further includes means for calculating as the reproduction width the number of the dot-forming bits corresponding to the successive dot-forming picture elements which line on each of the x-axis pixel lines or y-axis pixel lines.

In another form of the present invention, the determining means includes memory means for storing nominal width data which is indicative of at least one designated stroke selected from the at least one stroke of the character and which is representative of a nominal width as the outline width of each designated stroke. The determining means calculates the number of the successive dot-forming picture elements located between two segments of the outline of each designated stroke which define the nominal width, and the determining means determines that the difference exceeds the reference value if the calculated number of the dot-forming picture elements is different from the number which corresponds to the nominal width represented by the nominal width data. In this case, if the determining means determines that the calculated number of the dot-forming picture elements is different from the number corresponding to the nominal width, the data changing means changes the outline data of the character so as to move at least one of the two segments of each designated stroke, relative to the pixel screen. The direction and amount of movement of the at least one of the two segments are determined so that the calculated number of the dot-forming picture elements is equal to the number corresponding to the nominal width. While the nominal width data may be stored in the nominal width memory before the apparatus is delivered to a user or before the apparatus is operated, the apparatus may be adapted such that the nominal width data are automatically prepared and stored in the nominal width memory during operation of the apparatus. In this case, the apparatus further comprises selecting means for selecting a pair of two segments of the outline of the each stroke which define the nominal width of each stroke, from a plurality of segments which define the outline of the character, based on the outline data, and calculating means for calculating the nominal width of each stroke, based on the outline data representative of the pair of two segments selected by the selecting means. The calculated nominal width is stored into the memory means as the nominal width data.

BRIEF DESCRIPTION OF THE DRAWINGS

The above and other objects, features and advantages of the present invention will be understood by reading the following detailed description of presently preferred embodiments of the invention, when considered in conjunction with the accompanying drawings in which:

FIG. 3 is a flow chart illustrating a data conversion routine as one of control programs stored in a PROGRAM ROM of the control circuit;

FIG. 7 is a view indicating the outline width coordinate values, i.e., x-axis coordinate values of the intersections between the x-axis pixel lines and the outline of the character stroke of FIG. 5;

FIG. 8 is a view indicating the reproduction width coordinate values of the x-axis pixel lines obtained for the curved stroke of FIG. 5;

FIG. 9 is a view indicating the numbers designating the two outermost dot-forming picture elements on the x-axis pixel lines, at which image dots are to be formed;

FIGS. 15 and 16 are schematic views corresponding to those of FIG. 1, showing a second embodiment of the invention;

FIG. 17 is a flow chart illustrating a data conversion routine implemented in the second embodiment of FIGS. 15 and 16;

FIG. 18 is a view showing an outline of letter H to which the data conversion is effected in the second embodiment;

FIGS. 19(a) and 19(b) are views indicating stroke width data of the letter H of FIG. 18;

FIG. 20 is a view showing the outline of the letter H superimposed on the pixel screen;

FIGS. 21(a) and 21(b) are views for explaining a difference in the stroke width depending upon the position at which the stroke represented by the outline data is reproduced;

FIGS. 22(a) and 22(b) are views for explaining the correction of the width of a vertical stroke;

FIGS. 23(a) and 23(b) are views for explaining the correction of the width of a horizontal stroke;

FIGS. 26–30 are views illustrating the manner in which stroke width data are prepared in the third embodiment.

DETAILED DESCRIPTION OF THE PREFERRED EMBODIMENTS

Figure 1:
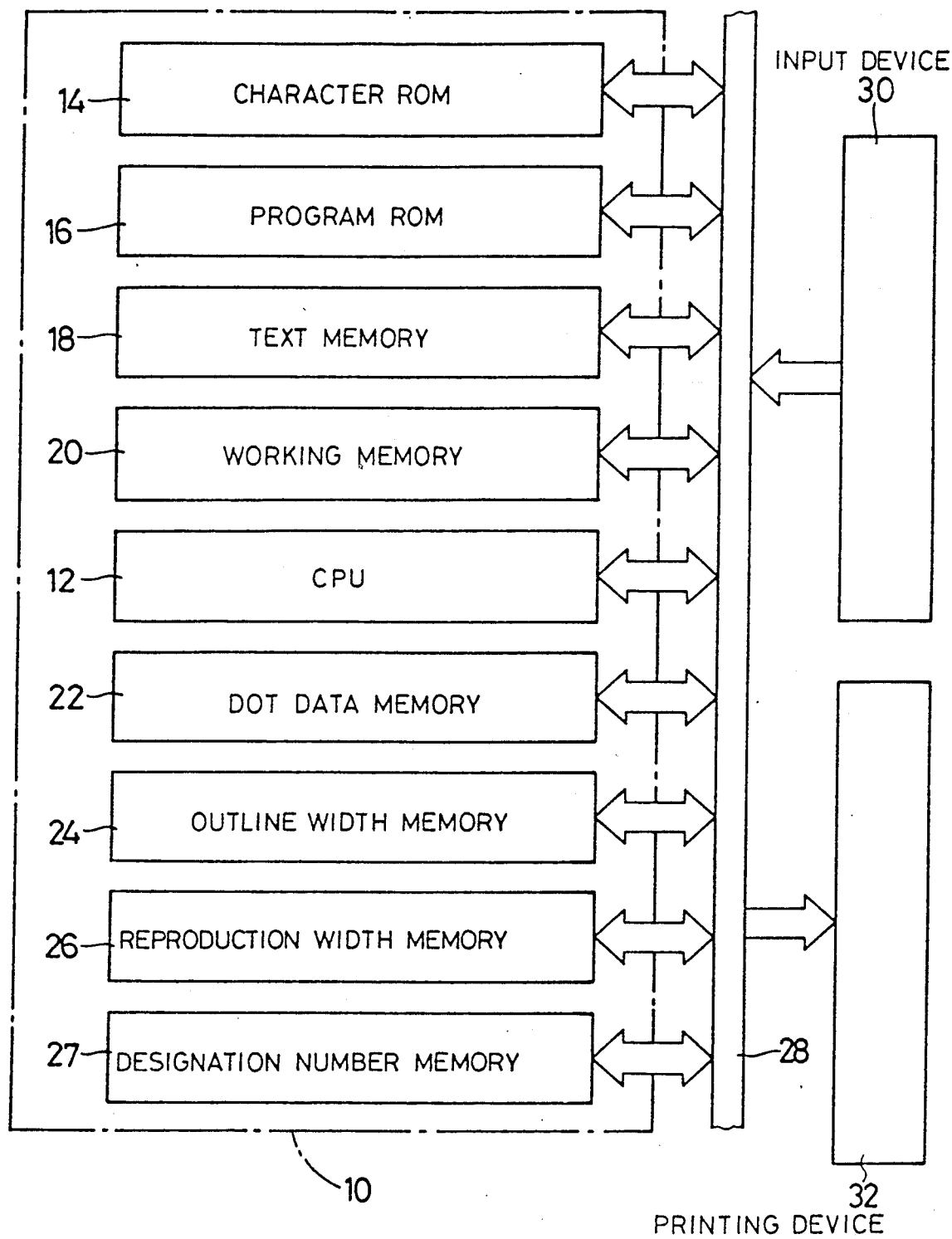
FIG. 1 is a schematic block diagram showing a control circuit of a laser printer which incorporates an embodiment of a data converting apparatus of the present invention.
Figure 2:
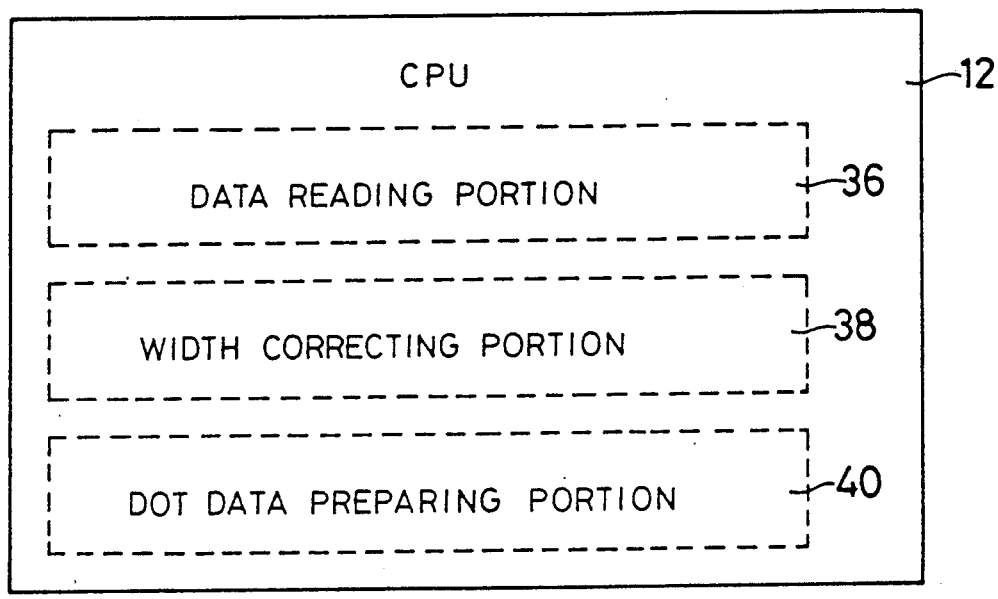
FIG. 2 is a schematic view of a central processing unit used in the control circuit of FIG. 1.

Referring first to FIGS. 1 and 2, there is shown a data converting apparatus constructed according to one embodiment of the present invention, for converting outline data into dot data for printing on a laser printer.

The schematic block diagram of FIG. 1 shows a portion of a control circuit of the laser printer, which relates to data conversion according to the principle of this invention. The control circuit is principally constituted by a microcomputer 10, which includes a CPU (central processing unit) 12, a CHARACTER ROM (read-only memory) 14, a PROGRAM ROM (read-only memory) 16, a TEXT memory 18, a WORKING memory 20, a DOT DATA memory 22, a OUTLINE WIDTH memory 24, a REPRODUCTION WIDTH memory 26 and a DESIGNATION NUMBER memory 27. These components of the microcomputer 10 such as the CPU 12 are interconnected to each other through a bus 28. To the bus 28, there are connected an input device 30 and a printing device 32. The input device 30 is provided to load the microcomputer 10 with data necessary for laser printing, and the printing device 32 operates to effect the laser printing according to commands and signals received from the microcomputer 10. The present laser printer has image resolving power of 300 dots per inch.

As schematically shown in FIG. 2, the CPU 12 incorporates a data reading portion 36, a width correcting portion 38, and a dot data preparing portion 40. The width correcting portion 38 operates to correct the outline width coordinates of a character stroke stored in the OUTLINE WIDTH memory 24, for obtaining the reproduction width of the stroke, as described later in greater detail. The dot data preparing portion 40 prepares dot data representative of a character. The dot data includes dot-forming bits indicative of the presence of image dots to be formed at respective picture element positions, as described later in detail.

The TEXT memory 18 is provided to store a batch of character outline data in the form of code data representative of a text which is entered through and received from the input device 30. The WORKING memory 20 functions to temporarily store data necessary for the microcomputer 10 to execute various control programs stored in the PROGRAM ROM 16. The DOT DATA memory 22 stores the dot data prepared by the dot data preparing portion 40. The OUTLINE WIDTH memory 24 stores outline width data of character strokes, which represents an outline width of a stroke, namely, x-axis coordinates of the intersections between x-axis pixel lines of a coordinated pixel screen (which will be described) and an outline of the stroke.

The REPRODUCTION WIDTH memory 26 stores reproduction width data of the stroke which represents a reproduction width of each stroke, namely, x-axis coordinates of the opposite ends of an array of the dot-forming picture elements on each x-axis pixel line, which picture elements lie within the outline of the stroke as represented by the outline data. The x-axis coordinates of the opposite ends of the array are the coordinate values of the ends of the two outermost dot-forming picture elements as viewed along the x-axis pixel line. The DESIGNATION NUMBER memory 27 stores designation number data representative of the numbers indicative of the positions of the two outermost dot-forming picture elements obtained for each x-axis pixel line, according to the correction of the reproduction width of each stroke.

Figure 4:
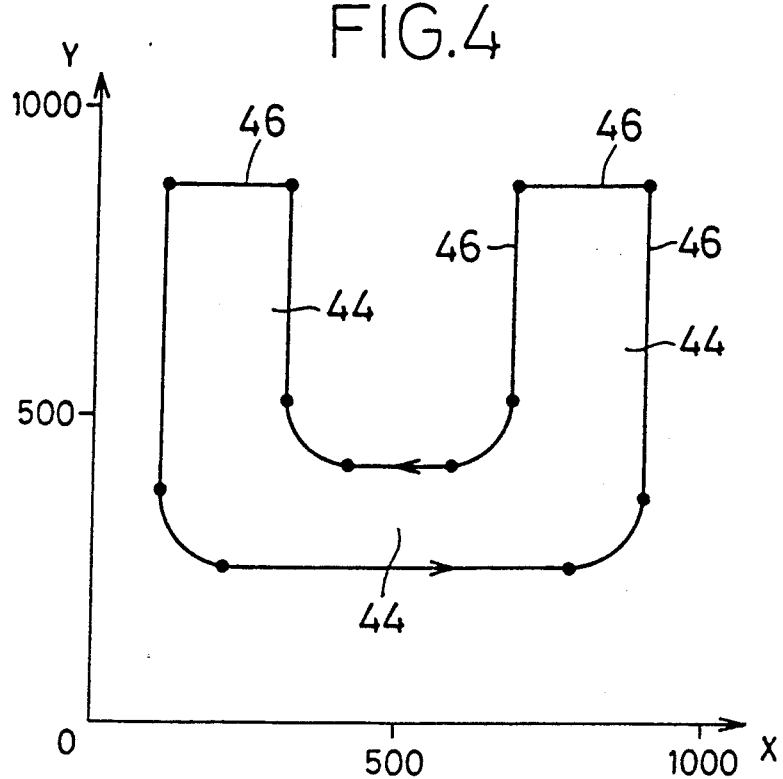
FIG. 4 is a view showing an outline of letter "U"

The CHARACTER ROM 14 stores multiple batches of outline data representative of the outlines of many characters such as alphabetic and other letters and symbols. As indicated in FIG. 4 which shows letter "U" by way of example, each character has one or more strokes 44 whose outline is defined by a plurality of segments 46. The width of each stroke 44 is defined by the appropriate two segments 46, while the length of each stroke 44 is also defined by the appropriate two segments 46.

The outline of each character is defined in an X-Y coordinate system having 1000 Y-axis positions taken along the vertical or Y axis, and 1000 X-axis positions taken along the horizontal or X axis, as indicated in FIG. 4. The uppercases of all alphabetic letters are placed between the 200th and 1000th Y-axis positions, while the entire range of the Y-axis is used for the lowercases. The outline data representative of the outline of each character consists of two or more sets of segment data which represents the segments 46 of the character.

Each segment 46 of the character outline is defined by two points (indicated by black dots in FIG. 4) which are the start and end points of the segment. Each set of segment data includes coordinate data representative of the coordinates of the start and end points of the segment, and segment-defining code data indicative of the kind of the segment (straight line, curved line or circular arc). The coordinate data of the points of the segments of the outline of the character are stored in the CHARACTER ROM 14, in the predetermined order, in the predetermined direction along the character outline, as indicated by arrows in FIG. 4. One of the two points defining each segment of the outline, whose coordinate data is stored preceding that of the other, is defined as the start point of the segment, while the other point is defined as the end point of the segment. The segment data for a straight segment includes segment-designating code data indicative of the straight segment, and coordinate data representative of the start and end points of the segment. The segment data for a curved segment includes segment-designating code data indicative of the curved segment, function data indicative of a curvature of the segment, and coordinate data representative of the coordinates of the start and end points and an auxiliary point of the curved segment. The segment data for a circular arc segment includes segment-designating code data indicative of the arc segment, and coordinate data representative of the coordinates of the start and end points and an arc center of the segment.

The CHARACTER ROM 14 also stores data indicative of the number "N" of the segments of each stroke of each character.

Figure 5:
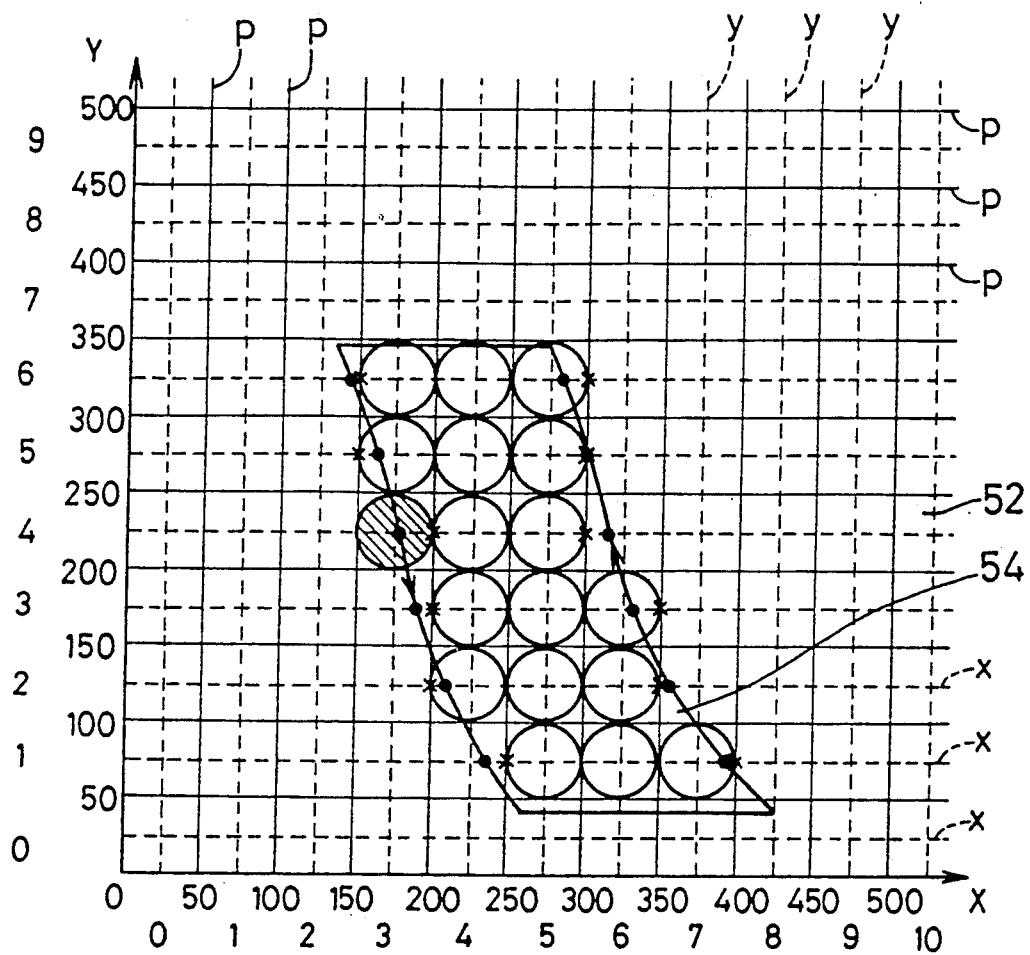
FIG. 5 is a view showing a curved stroke of a character whose outline data is converted into dot data by the data converting apparatus of FIG. 1 and whose outline is superimposed on a coordinated pixel screen.

In the present laser printer, the conversion of the outline data of each character into a corresponding batch of dot data is effected by using a two-dimensional coordinated pixel screen 52 as shown in FIG. 5, on which the outline of a character is superimposed for calculating or working out the appropriate dot data representative of image dots for printing the character. The pixel screen 52 has a multiplicity of picture elements, which are the smallest parts of a printed picture image (visible representation such as a character or graphical representation) available on the laser printer. The picture elements are defined by equally spaced-apart x-axis partition lines p parallel to the X axis of the screen 52, and equally spaced-apart y-axis partition lines p parallel to the Y axis of the screen and perpendicular to the X axis. In the present embodiment, the picture elements are square in shape. The partition lines p are indicated by solid lines in FIG. 5.

As indicated by dashed lines in FIG. 5, a multiplicity of x-axis pixel lines x extend parallel to the X axis, each being positioned intermediate between the adjacent x-axis partition lines p, while a multiplicity of y-axis pixel lines y extend parallel to the Y axis, each being positioned intermediate between the adjacent y-axis partition lines p. Each x-axis pixel line x passes the centers of the picture elements in a corresponding row or array parallel to the X axis, while each y-axis pixel line y passes the centers of the picture elements in a corresponding row or array parallel to the Y axis. The position of each picture element is indicated by the coordinates of its center, i.e., the coordinates of one of the x-axis pixel lines x and one of the y-axis pixel lines y. Each bit of the dot data corresponding to each picture element indicates whether an image dot is to be printed at the corresponding picture element, or not. Namely, the logical values of the bits of the dot data are set to "1", which indicates the presence of the image dots which correspond to the picture elements which lie within the character outline (more precisely, within the area surrounded by the outline of each stroke of the character). These bits are referred to as "dot-forming bits". The picture elements may have rectangular or other shapes.

The coordinated pixel screen 52 corresponds to a printing area of a recording medium within which characters represented by the dot data are laser-printed. In this respect, it is noted that FIG. 5 shows a portion of the pixel screen 52 in which a portion of a character is indicated, in the interest of brevity and simplification. The x-axis and y-axis pixel lines x and y, and the partition lines p are identified by the coordinate values. The pixel lines x and y are numbered over the entire area of the screen 52. It will be understood that the picture elements of the characters not shown in FIG. 5 are represented by the x-axis and y-axis pixel lines x, y which are identified by the numbers larger than those indicated in FIG. 5.

The present laser printer is capable of printing the characters in a selected one of different sizes, namely, 4.8 point, 10 points, 12 point, 20 point, 24 point and 30 point, by way of example. According to the selected character size, the coordinates of the points defining the outline of the character in the 1000×1000 coordinate system of FIG. 4 are converted into the corresponding coordinate values on the pixel screen 52 of FIG. 5, in which each square picture element is dimensioned as 1×1. Suppose a character is formed by a C×C matrix of picture elements (dots), the dimension of each side of each picture element (size of the picture elements) is equal to 1000/C. In the present example, the character size is 4.8 point and each character is formed by a 20×20 matrix of picture elements (dots). Accordingly, each picture element on the pixel screen 52 of FIG. 5 corresponds to a difference of "1" between the identification numbers of the adjacent two pixel lines x, y and corresponds to the coordinate values of "50" in the 1000×1000 coordinate system of FIG. 4.

The identification numbers designating the pixel lines x, y and the picture elements, and the coordinate values indicating the partition and pixel lines p, x, y are given along the X and Y axes of the pixel screen 52 of FIG. 5. The position of any picture element on the pixel screen 52 may therefore be designated by one of the identification numbers given along the X axis, and one of the identification numbers given along the Y axis. For example, a combination of the identification numbers (2, 2) designates the picture element defined by the x-axis partition lines p whose y-axis coordinate values are "100" and "150" and the y-axis partition lines p whose x-axis coordinate values are "100" and "150". When the character outline is superimposed on the pixel screen 52, the coordinate values of the reference point of the character on the screen 52 are determined based on the printing position data supplied from the input device 30. According to the determined coordinates of the reference point, the character outline is positioned on the pixel screen 52.

Figure 6:
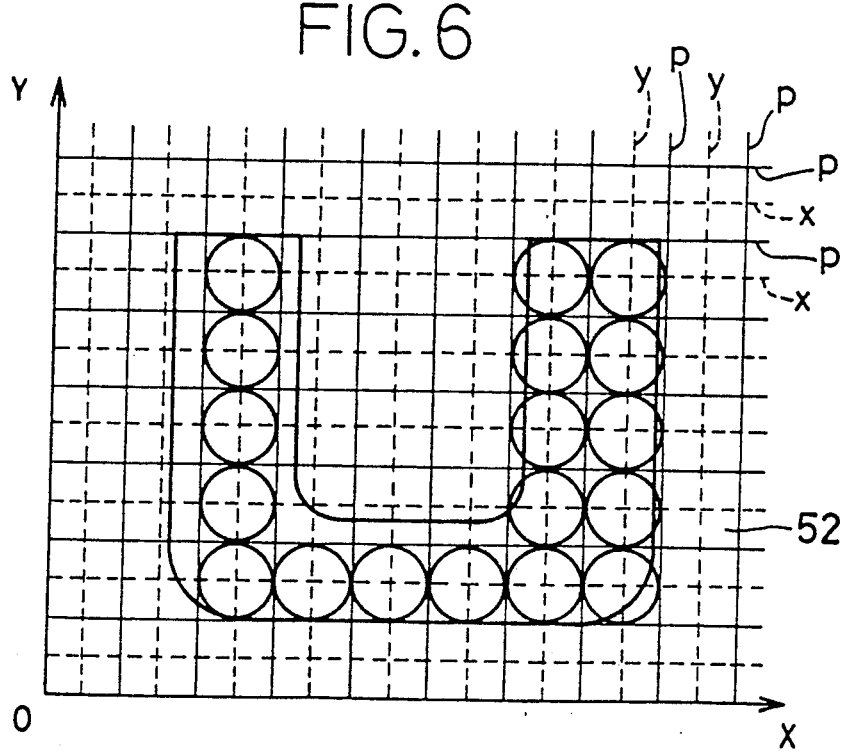
FIG. 6 is a view showing the letter "U" whose outline is superimposed on the pixel screen.

Thus, the position of the outline of a character as superimposed on the pixel screen 52 is influenced by the printing position of the character, as well as by the selected character size. This may cause a problem that the number of the dot-forming picture elements which lie within the outline of the character tends to vary or fluctuate, with variations in the width and configuration of a stroke or strokes of the character. In this example, the term "width" is a dimension of a character stroke taken along the X axis of the pixel screen 52. When the outline data for the letter "U" are normally converted into dot data according to a certain rule, image dots are formed according to the obtained dot data, as indicated by circles in FIG. 6, which corresponds to the dot-forming picture elements. Although the opposite two strokes of the letter "U" as represented by the outline data have the same width, the widths of the two opposite strokes as formed by the image dots produced according to the dot data are different from each other, as also indicated in FIG. 6. These widths according to the normally prepared dot data are referred to as "reproduction width" of the stroke. In the case of a curved stroke 54 of the character shown in FIG. 5, the outline width as defined by the outline data is constant in the y-axis direction, but the reproduction width deviates from the nominal outline width in some area of the stroke 54. Namely, the width along the x-axis pixel line x whose number is "4" is smaller than the nominal outline value.

In view of the above, the present laser printer is adapted to print a character so that the width of each stroke of the character is substantially equal to the nominal outline width as defined by the outline data of the character. The control programs stored in the PROGRAM ROM 16 includes the data conversion routine of the flow chart of FIG. 3 in which the reproduction width of the character stroke as normally determined is corrected when necessary. There will be described an operation to convert the outline data of the curved segment 54 of FIG. 5 into corresponding dot data, by way of example, referring to the flow chart of FIG. 3. As described in co-pending U.S. patent application Ser. No. 07/425,604 filed Oct. 23, 1989, the dot data bits for each x-axis pixel line x intersecting the stroke 54 are set to "1" at one time, for the two outermost dot-forming picture elements and the picture element or elements between the two outermost picture elements. The two outermost dot-forming picture elements are determined based on the coordinates of the intersections between each x-axis pixel line x and the outline of the stroke 54, according to a predetermined rule as disclosed in the above-identified application. Since the details of the manner of determining the two outermost dot-forming picture elements are not essential to the understanding of the principle of the present invention, no further description will be provided in this respect. Further, the manner of printing according to the prepared dot data is not essential to the understanding of the invention, it will be only briefly described. The printing is effected one page after another, according to batches of dot data which are prepared by conversion from the character outline data stored in the TEXT memory 18. Each time the outline data for each page of a text is read out from the TEXT memory 18, the outline data representative of the outlines of a multiplicity of characters are converted into a corresponding batch of dot data representative of the dot-forming picture elements.

Initially, step S1 is executed to read the outline data of the relevant stroke 54, the number "N" of the segments of the outline of the stroke 54, and the number "S" of the x-axis pixel lines x for one character. The number "S" represents the selected character size, i.e., 4.8 point in this specific example as described before. Step S1 is followed by step S2 to calculate the x-axis coordinate values of intersections between the first segment of the outline of the stroke 54 and each x-axis pixel line x which intersects the outline. The calculated x-axis coordinate values are stored in the OUTLINE WIDTH memory 24, as the outline width data representative of the outline width of the stroke 54 as desired by the outline data, for each x-axis pixel line x. This calculation is effected for each of the segments of the outline of the stroke 54, in the direction indicated by arrows in FIG. 5. In this example, however, the only two segments of the stroke outline intersect the x-axis pixel lines x. The calculated intersections are indicated by black dots in FIG. 5, and their x-axis coordinate values are stored in the OUTLINE WIDTH memory 24, together with the y-axis coordinate values of the relevant x-axis pixel lines x, as indicated in FIG. 7.

Figure 11:
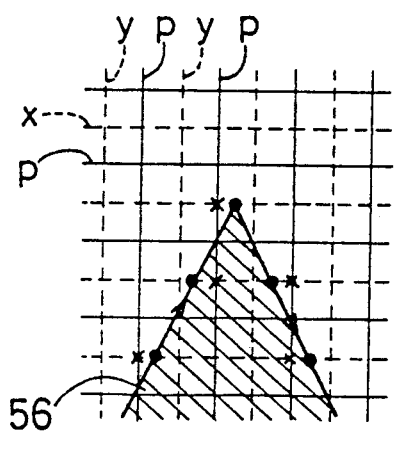
FIGS. 11–13 are illustrations for explaining the manners of calculating or determining the outline width coordinate values of the intersections of FIG. 7, the reproduction width coordinate values of FIG. 8, and the designation number of the outermost dot-forming picture elements of FIG. 9.

If an x-axis pixel line x intersects the outline of a stroke at only one point as indicated by the uppermost black dot in FIG. 11, the two same x-axis coordinate values of the calculated intersection are stored for that x-axis pixel line x. In other words, two x-axis coordinate values are stored for each x-axis pixel line x which intersects the outline of the stroke. In the example of FIG. 11, the intersection indicated by the uppermost black dot is the end point of one segment of the outline of a stroke 56, and at the same time the start point of the next segment in the direction of arrows.

After the x-axis coordinate values of the intersections of the first segment of the stroke 54 are stored in the OUTLINE WIDTH memory 24 in step S2, the control flow goes to step S3 to increment a count "n1" and step S4 to determine whether the count "n1" becomes equal to "N" (number of the segments of the outline of the stroke 54), or not. In the first control cycle, a negative decision (NO) is obtained in step S4, and the control flow goes back to step S2.

When the x-axis coordinate values of the intersections of all the segments of the outline of the stroke 54 have been calculated and stored, that is, when an affirmative decision (YES) is obtained in step S4, the control flow goes to step S5 to reset the count "n1", and to step S6 in which the calculated x-axis coordinate values of each x-axis pixel line x are ordered from the smallest to the largest, and the successive two values are paired. In this respect, it is noted that a segment of the outline of a stroke may be processed before another segment whose x-axis coordinate values are smaller than those of that earlier processed segment, whereby the x-axis coordinate values calculated in step S2 are stored at random in the memory 24, irrespective of the magnitude of the values. In view of this, step S6 is implemented so that the two x-axis coordinate values represent the outline width of each stroke of the character as measured along the x-axis pixel lines x, even if the character consists of two or more strokes. Each pair of the stored x-axis coordinate values for each x-axis pixel line x are referred to as "outline width coordinates", whose difference will be referred to as "outline width" (i.e., nominal width of a stroke as defined by the outline data).

Then, the control flow goes to step S7 in which the reproduction width coordinates of each x-axis pixel line x are calculated based on the outline width coordinates stored in the OUTLINE WIDTH memory 24. The reproduction width coordinates are the x-axis coordinate values of the opposite ends of the array of the dot-forming picture elements along each x-axis pixel line x. Namely, the reproduction width coordinates are the x-axis coordinate values of the two outermost dot-forming picture elements, as measured at the outer end of each outermost dot-forming picture element which is remote from the centerline of the relevant stroke 54. The outer end of the two outermost dot-forming picture elements is defined by one of the y-axis partition lines p which is nearest to the corresponding outline width coordinate stored in the memory 24. The calculated reproduction width coordinates are indicated by "x" marks in FIG. 5.

The thus calculated reproduction width coordinates are stored in the REPRODUCTION WIDTH memory 26 in step S7, for each pixel line x, as indicated in FIG. 8. The reproduction width coordinate is obtained for each pair of outline width coordinates obtained in step S2 for each x-axis pixel line x. Therefore, a difference between each pair of the reproduction width coordinates represents a reproduction width of the stroke 54 as reproduced by the image dots formed by the laser printing according to the dot data. After the reproduction width coordinates for all the outline width coordinates have been calculated and stored, the control flow goes to step S8 to calculate a difference between the outline width and the reproduction width of the stroke 54 along the relevant x-axis pixel line x. More specifically, the smaller one of each pair of outline width coordinates is subtracted from the larger one of the outline width coordinates, to calculate the outline width, while the smaller one of each pair of reproduction width coordinates is subtracted from the larger one of the reproduction width coordinates, to calculate the reproduction width. Then, the outline width is subtracted from the reproduction width. The difference and the sign of the difference are stored in the WORKING memory 20 in step S8.

Then, the control flow goes to step S9 to determine whether or not the absolute value of each width difference obtained in step S8 for the relevant x-axis pixel line x is equal to or larger than a reference value. In this example, the reference value is "25" which is a half of the size "50" of the picture elements. That is, the width difference is compared with the reference value, to determine the necessity of correcting the reproduction width of the stroke 54 for the relevant x-axis pixel line x, irrespective of which one of the outline and reproduction widths is larger. Where the absolute value of the width difference is smaller than the reference value of "25", this indicates that the width difference is held within a permissible range that does not require the correction of the reproduction width. If the width difference is equal to or larger than the reference value, step S9 is followed by step S10 to correct the reproduction width.

Steps S9 and S10 will be described in greater detail, referring to the outline and reproduction widths of the stroke 54 obtained for the x-axis pixel lines x whose y-axis coordinate values are "175" and "225". For the x-axis pixel line x whose y-axis coordinate value is "175", the outline width coordinates are "190" and "330", while the reproduction width coordinates are "200" and "350". Therefore, the outline width is "140" while the reproduction width is "150". Consequently, the width difference "10" is smaller than the reference value "25", whereby the correction of the reproduction width in step S10 is not effected.

For the x-axis pixel line x whose y-axis coordinate is "225", the outline width coordinates are "180" and "315" while the reproduction width coordinates are "200" and "300". Therefore, the outline width is "135" while the reproduction width is "100". Thus, the width difference "35" is larger than the reference value "25". In this case, an affirmative decision (YES) is obtained in step S9, and step S10 is implemented to correct the reproduction width. Generally, the correction is made by changing one of the two reproduction width coordinates. Initially, a difference between the larger outline and reproduction width coordinates and a difference between the smaller outline and reproduction width coordinates are calculated. One of the two reproduction width coordinates which is associated with a larger one (absolute value) of the two calculated differences is changed. The direction in which the relevant reproduction width coordinate is changed (i.e., increased or decreased) depends upon whether the relevant reproduction width coordinate is larger or smaller than the corresponding outline width coordinate. Namely, the sign of the difference stored in the WORKING memory 20 is read out. If the sign is negative and the reproduction width is smaller than the outline width, the relevant reproduction coordinate is decreased to the x-axis coordinate value of the y-axis partition line p which is next in the negative direction to that whose x-axis coordinate is equal to the relevant reproduction coordinate. If the larger reproduction width coordinate is changed, this coordinate is increased to the x-axis coordinate value of the y-axis partition line p which is next in the positive direction to that whose x-axis coordinate is equal to the relevant reproduction coordinate.

If the reproduction width is larger than the outline width and the smaller one of the two reproduction width coordinates is changed, the smaller reproduction coordinate is increased to the x-axis coordinate value of the y-axis partition line p which is next in the positive direction to that whose x-axis coordinate is equal to the relevant reproduction width coordinate. If the larger reproduction width coordinate is changed, it is decreased to the x-axis coordinate value of the y-axis partition line p which is next in the negative direction to that whose x-axis coordinate value is equal to the relevant reproduction width coordinate. If the difference between the smaller outline and reproduction width coordinates is equal to that between the larger outline and reproduction width coordinates, either one of the two reproduction width coordinates may be changed. In the present embodiment, the smaller reproduction width coordinate is changed in this case.

In the present case, the difference "20" between the smaller outline and reproduction width coordinates "180" and "200" is larger than the difference "15" between the larger outline and reproduction width coordinates "315" and "300", and the reproduction width is smaller than the outline width. Accordingly, the smaller reproduction coordinate "200" is decreased to "150", whereby the reproduction width is increased by an amount equal to the pitch of the picture elements. In the present embodiment, the reference value "25" is a half of the size or pitch "50" of the picture elements, and the reproduction width is changed by an amount corresponding to one picture element, if the difference between the outline and reproduction widths is equal to or larger than the reference value. If the reference value is smaller than the half of the size of the picture elements, the amount of change or correction of the reproduction width is larger than the difference between the outline and reproduction widths. In this case, the stroke as reproduced has a larger variation in the width and has a deteriorated appearance. In the case of the reference value equal to the half of the size of the picture elements, the amount of change of the reproduction width does not exceed the difference between the outline and reproduction widths, and the change of the reproduction width will not result in increasing the difference between the outline and reproduction widths.

Where an x-axis pixel line x intersects two or more strokes of a character, two or more pairs of outline width coordinates and the corresponding pairs of reproduction width coordinates are calculated. In this case, two or more width differences are calculated in step S8, starting from the difference associated with the smallest outline and reproduction width coordinates. If any one of the width differences is equal to or larger than the reference value, an affirmative decision (YES) is obtained in step S9, and step S10 is implemented to correct the appropriate reproduction width coordinate.

If the determination in step S9 and the correction in step S10 (if necessary for any width difference) have been effected for all the width differences obtained of the first x-axis pixel line, the control flow goes to step S11 to increment a count "n2" and to step S12 to determine whether the count "n2" becomes equal to "S", i.e., to determine whether the determination in step S9 and the correction in step S10 if necessary have been effected for all the pixel lines x. If a negative decision (NO) is obtained in step S12, the control flow goes back to step S8. Steps S8–S12 are repeatedly executed until an affirmative decision (YES) is obtained in step S12.

When an affirmative decision (YES) is obtained in step S12, step S13 is executed to calculate the designation numbers for designating the two outermost dot-forming picture elements to determine the dot-forming picture elements at which image dots are to be formed. In the next step S14, the logical values of the dot data bits corresponding to these dot-forming picture elements are set to "1". As described before, the reproduction width coordinates are the x-axis coordinates of the appropriate two y-axis partition lines p parallel to the Y axis of the pixel screen 54. The two outermost dot-forming picture elements for each stroke of the character correspond to the corresponding pair of reproduction width coordinates. One of the two outermost dot-forming picture elements which corresponds to the smaller one of the reproduction width coordinates of each pair is defined by the y-axis partition line p whose x-axis coordinate value is equal to the smaller reproduction width coordinate, and the y-axis partition line p which is located next in the positive direction. On the other hand, the other outermost dot-forming picture element corresponding to the larger reproduction width coordinate is defined by the y-axis partition line p whose x-axis coordinate value is equal to the larger reproduction width coordinate, and the y-axis partition line p which is located next in the negative direction. The x-axis identification numbers of these two outermost dot-forming picture elements are stored in the DESIGNATION NUMBER memory 27, for each x-axis pixel line x, together with the data indicative of the x-axis pixel line x. As indicated in FIG. 9, the x-axis pixel lines x are identified by the y-axis identification numbers of the picture elements. Thus, the positions of the outermost dot-forming picture elements which define the outline of the curved stroke 54 are designated by the x-axis and y-axis identification numbers of the picture elements (x-axis and y-axis pixel lines x, y on the pixel screen 52).

Figure 10:
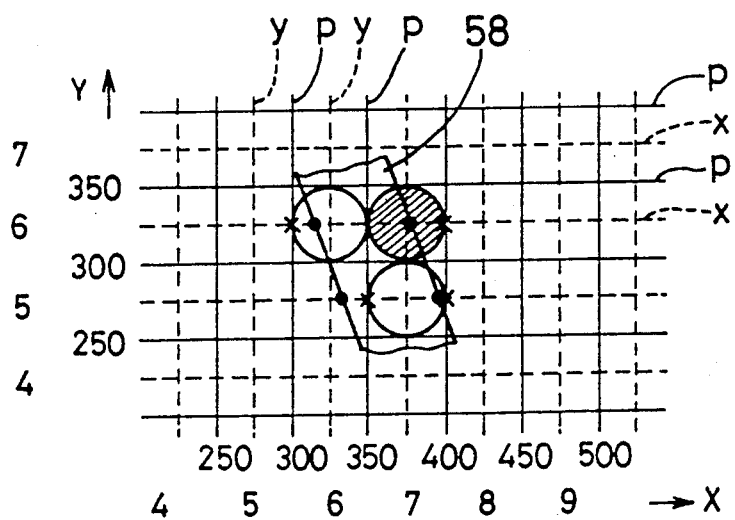
FIG. 10 is a view illustrating the manner in which the width of a character stroke to be reproduced is reduced from the nominal value.

For the x-axis pixel line x whose y-axis coordinate value is "225", a smaller one of the designation numbers of the two outermost dot-forming picture elements is determined based on the smaller reproduction width coordinate which was decreased or corrected in step S10. Namely, the designation number "3" is stored as one of the two outermost dot-forming picture elements, which is indicated by hatched circle in FIG. 5. Accordingly, an image dot is formed at the position of this outermost dot-forming picture element, when the curved stroke 54 is printed.

Where the reproduction width of a stroke is larger than the outline width of the stroke by an amount equal to or larger than the reference value, the reproduction width is changed in step S10 in the following manner, so that one of the designation numbers is determined based on the changed reproduction width. In the case of a portion of a segment 58 indicated in FIG. 10, the outline width coordinates of the x-axis pixel line x whose y-axis coordinate is "325" are "315" and "380", and the reproduction width coordinates of the same x-axis pixel line x are "300" and "400". Therefore, the outline width and the reproduction width of the segment 58 along the relevant pixel line x are "65" and "100", respectively. In this case, the difference (absolute value) between the corresponding outline and reproduction width coordinates "380" and "400" is larger than the difference between the other corresponding outline and reproduction width coordinates "315" and "300". Accordingly, the reproduction width coordinate "400" whose difference with respect to the corresponding outline width coordinate "380" is larger is decreased to "350". Namely, the corrected reproduction width coordinates are "300" and "350", from which the designation number "6" is obtained as the number designating the two outermost dot-forming picture elements. While the two sets of data indicative of the designation number "6" are stored in the DESIGNATION NUMBER memory 27 in step S13 in this case, only the dot data bit corresponding to the designation number "6" is set to "1" in step S14, so that only one image dot is formed according to the prepared dot data for the relevant x-axis pixel line x, as indicated by white circle in FIG. 10. In this case, the two outermost dot-forming picture elements designated by the designation number "6" are considered to be superposed on each other. Thus, an image dot is not formed at the position of the picture element indicated by hatched circle in FIG. 10, and the width of the segment 58 along the relevant x-axis pixel line x is defined by one image dot and is equal to the width along the adjacent x-axis pixel line x whose y-axis coordinate is "275".

In the case of the stroke 56 shown in FIG. 11, two same outline width coordinates are obtained for the intersection indicated by the uppermost black dot. Accordingly, two same reproduction width coordinates are obtained corresponding to the two same outline width coordinates. In this case, the outline width and the reproduction width are both zero, whereby a negative decision (NO) is obtained in step S9, and the reproduction width data are not corrected in step S10. In the case where the two reproduction coordinates are the same as in the above case, two sets of data indicative of the number designating the picture element whose center is nearest to the outline width coordinates (two same values) are stored in step S13, to designate the two mutually superposed outermost dot-forming picture elements, so that the dot data bit corresponding to the stored designation number is set to "1".

Figure 12:
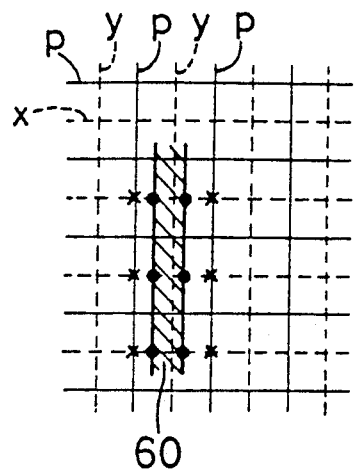
Figure 13:
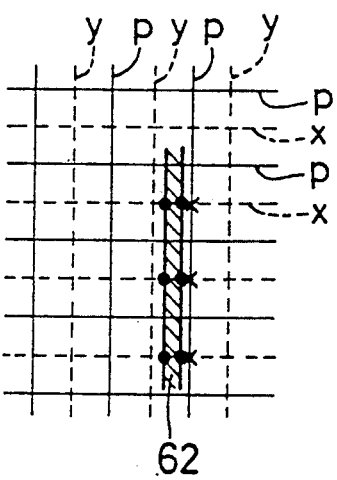

In the case of a relatively narrow straight stroke 60 which is parallel to the Y axis and is interposed between the adjacent two y-axis partition lines p, the y-axis pixel line y between these adjacent two y-axis partition lines p is located within the width of the stroke 60. In this case, the two reproduction width coordinates are the x-axis coordinate values of the two y-axis partition lines p, as indicated by "x" marks in FIG. 12. In this case, a negative decision (NO) is obtained in step S9, if the outline width of the stroke 60 (indicated by black dots) is larger than "25", and the correction of the reproduction width coordinates in step S10 is not effected. If the outline width is equal to or smaller than "25", the difference between the outline and reproduction widths is equal to or larger than the reference value "25", whereby an affirmative decision (YES) is obtained in step S9, to effect the correction in step S10. In this latter case, one of the two reproduction width coordinates is changed to the other coordinate, so that the two reproduction width coordinates are the same to obtain only one image dot. As a result, the identification number of the y-axis pixel line y located within the outline width of the stroke 60 is used as the designation number designating the two superposed outermost dot-forming picture elements, so that the dot data bit corresponding to the designation number is set to "1".

In the case of a narrow straight stroke 62 which is parallel to the Y axis and interposed between the adjacent two y-axis pixel lines y. In this case, the x-axis coordinate value of the y-axis partition line p between the adjacent two y-axis pixel lines y is used as the two reproduction width coordinates. In this case, a negative decision (NO) is obtained in step S9 if the outline width of the stroke 62 is smaller than the reference value "25", and the correction in step S10 is not effected. If the two the x-axis coordinate value of the relevant y-axis partition line p, that is, if the relevant y-axis partition line p is not located within the outline width of the stroke 62, the identification number of the y-axis pixel line y (picture element) nearest to the relevant y-axis partition line p is used as the designation number stored in step S13. If the two outline width coordinates are smaller and larger than the x-axis coordinate value of the relevant y-axis partition line p, respectively, that is, if the relevant partition line p is located within the outline width, the identification number of one of the adjacent two y-axis pixel lines y which is nearer to the stroke 62 is used as the designation number. If the differences of the two outline width coordinates with respect to the reproduction width coordinates (x-axis coordinate of the relevant y-axis partition line p) are the same, the identification number of one of the adjacent two y-axis pixel lines y is used as the designation number. If the outline width of the stroke 62 is equal to or larger than "25", an affirmative decision (YES) is obtained in step S9, and the correction in step S10 is effected. In this case, the relevant y-axis partition line p is located within the outline width of the stroke, and the reproduction width coordinates are changed to the x-axis coordinate value of one of the two next y-axis partition lines p which is nearer to the stroke 62. If the differences of the two outline width coordinates with respect to the reproduction width coordinates are the same, that is, if the relevant y-axis partition line p is located at the middle of the outline width, the reproduction width coordinates are changed to the x-axis coordinate value of either one of the two next y-axis partition lines p.

After the designation numbers designating the two outermost dot-forming picture elements for all the x-axis pixel lines x have been calculated and stored in the DESIGNATION NUMBER memory 27 in step S13, the control flow goes to step S14 to prepare the dot data. More specifically, the logical values of the bits of the dot data corresponding to the two outermost dot-forming picture elements designated by the respective pair of designation numbers stored in the memory 27, and the picture elements between the two outermost picture elements, are all set to "1" at one time. If two or more pairs of designation numbers are stored for the same x-axis pixel line x, the setting of the dot-forming bits is effected beginning with the pair having the smallest designation number.

The preparation of the dot data in step S14 is effected one byte after another. The microcomputer 10 is capable of processing one byte of data at a time, namely, capable of setting eight bits corresponding to respective eight picture elements at one time. If all the successive dot-forming picture elements designated by each pair of designation numbers correspond to one byte, the dot data bits corresponding to all the dot-forming picture elements are set to "1" at one time. If the successive dot-forming picture elements correspond to the bits of two or more bytes, the dot-forming picture elements are divided into the corresponding two or more groups, based on the numbers of the bits which separate the adjacent bytes. The dot data bit or bits corresponding to each group of the dot-forming picture element or elements is/are set to "1" at one time.

Figure 14:
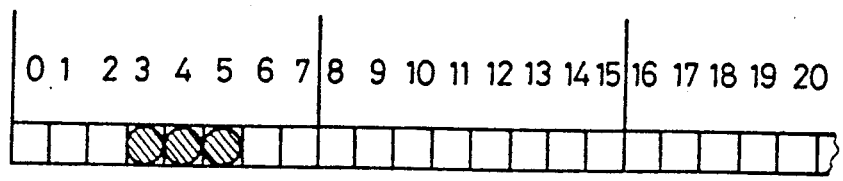
FIG. 14 is a view for explaining the setting of the dot data bits according to the designation numbers of the dot-forming picture elements.

Referring to FIG. 14, an example of the setting of the dot data bits will be described with respect to the pair of designation numbers (3, 5) stored for the x-axis pixel line x whose y-axis identification number is "4", as indicated in FIG. 9. The designation numbers (3, 5) designate the two outermost dot-forming picture elements on the pixel screen 52, as indicated in FIG. 5. Initially, the larger designation number "5" is compared with the number "7" of the last bit of the first byte which is larger than the smaller designation number "3". Since the larger designation number "5" is smaller than the number "7" of the last bit, it is determined that the bits corresponding to all the dot-forming picture elements designated by the designation numbers (3, 5) belong to the first byte. Accordingly, all the bits corresponding to these dot-forming picture elements are set to "1" at one time, as indicated by hatched circles in FIG. 14. If the larger designation number is larger than the number of the last bit of a byte, the dot-forming picture element designated by the smaller designation number, the dot-forming picture element corresponding to the last bit of the above-indicated byte, and the dot-forming picture element or elements between the above two dot-forming picture elements belong to a first group corresponding to the above-indicated byte, and the other dot-forming element or elements belong to a second or subsequent group corresponding to the high-order byte or bytes. The bits corresponding to the picture elements of the first group are set to "1" at one time. Then, the grouping of the remaining picture elements is effected so that the bits of the next byte corresponding to the next group of picture elements are set to "1". Similar operation is repeated until the setting of the bits is completed for the last picture element or last group of picture elements.

It will be described from the foregoing description of the present embodiment of the invention that the reproduction width of a stroke of a character or the number of image dots as reproduced according to the normally prepared dot data is corrected or changed as a result of comparison of the reproduction width with the nominal outline width defined by the outline data of the character, so that the printed stroke has a width substantially equal or close to the nominal or desired width. This arrangement avoids a variation in the width of a given portion of the printed stroke, when the printing position of the stroke (printing position of the same character) on the recording medium is changed. The arrangement is also effective to avoid a difference in the width between different portions of the same stroke having a constant width. Thus, the correction of the number of image dots as needed assures improved appearance of the reproduced character.

In the above embodiment, only the character outline data, and the number data representative of the numbers "N" and "S" of the segments of a stroke and the x-axis pixel lines x are required to correct the reproduction width of the stroke. Accordingly, the required total amount of data that should be stored prior to the correction may be comparatively small.

In the above embodiment, the portions of the PROGRAM ROM 16 assigned to execute steps S13 and S14 and the dot data preparing portion 40 of the CPU 12 constitute dot data preparing means for preparing dot data corresponding to the outline data, and the portions of the PROGRAM ROM 16 assigned to execute steps S2-S9 and the width correcting portion 38 of the CPU 12 constitute determining means including comparing means for comparing the outline and reproduction widths with each other, to determine whether a difference between the outline and reproduction widths exceeds a predetermined value. Further, the portions of the PROGRAM ROM 16 assigned to execute step S10 and the width correcting portion 38 of the CPU 12 constitute data changing means including width correcting means for changing or correcting the reproduction width of a stroke as reproduced according to the normally prepared dot data (normally set dot-forming bits), as a result of the comparison of the outline and reproduction widths.

In the above embodiment, the reference value used in step S9 is the same value irrespective of whether the outline width is larger or smaller than the reproduction width. However, first and second different reference values may be used depending upon which one of the outline and reproduction widths is larger.

In the above embodiment, the reproduction width is changed or corrected if the difference between the outline and reproduction widths is larger than the reference value, irrespective of which one of the outline and reproduction widths is larger. However, the correction may be effected in only one of the two cases.

Further, the correction in step S10 may be effected only where the selected character size is 12 point or smaller.

While the dot data bits corresponding to the determined two outermost dot-forming elements and the dot-forming element or elements therebetween are all set to "1" at one time, it is possible that the dot data bits corresponding to the picture elements which lie within the character outline so as to meet the predetermined requirement are set to "1" on a bit by bit basis. For example, the picture elements are determined to be the dot-forming picture elements if the centers of the picture elements are located within the character outline, or if the predetermined percent of the entire area of each picture element lies within the character outline. In these cases, the correction of the reproduction width is implemented after the dot data have been prepared.

In the above embodiment, the reproduction width of a stroke is taken in the direction of the X axis of the pixel screen 52, the reproduction width may be taken in the direction of the Y axis, so that the width of the stroke as measured along the Y axis is corrected. The correction of the reproduction width may be effected in both X and Y directions.

The above embodiment may be modified such that if the difference between the outline width and the once corrected reproduction width exceeds a predetermined value, the once corrected reproduced width may be re-corrected. However, at least one correction of the reproduction width is effective to reduce the difference between the outline and reproduction widths, and provides for improved appearance or quality of the reproduced character.

The outline data for each character may consist solely of coordinate data. In this case, the outline data for a character consisting of two or more straight strokes consists of sets of coordinate data representative of the coordinates of the points defining the straight strokes. If the strokes of a character include a curved or arcuate stroke or strokes, the outline data include sets of coordinate data representative of two or more points which are concatenated to approximately define each curved or arcuate stroke.

Figure 15:
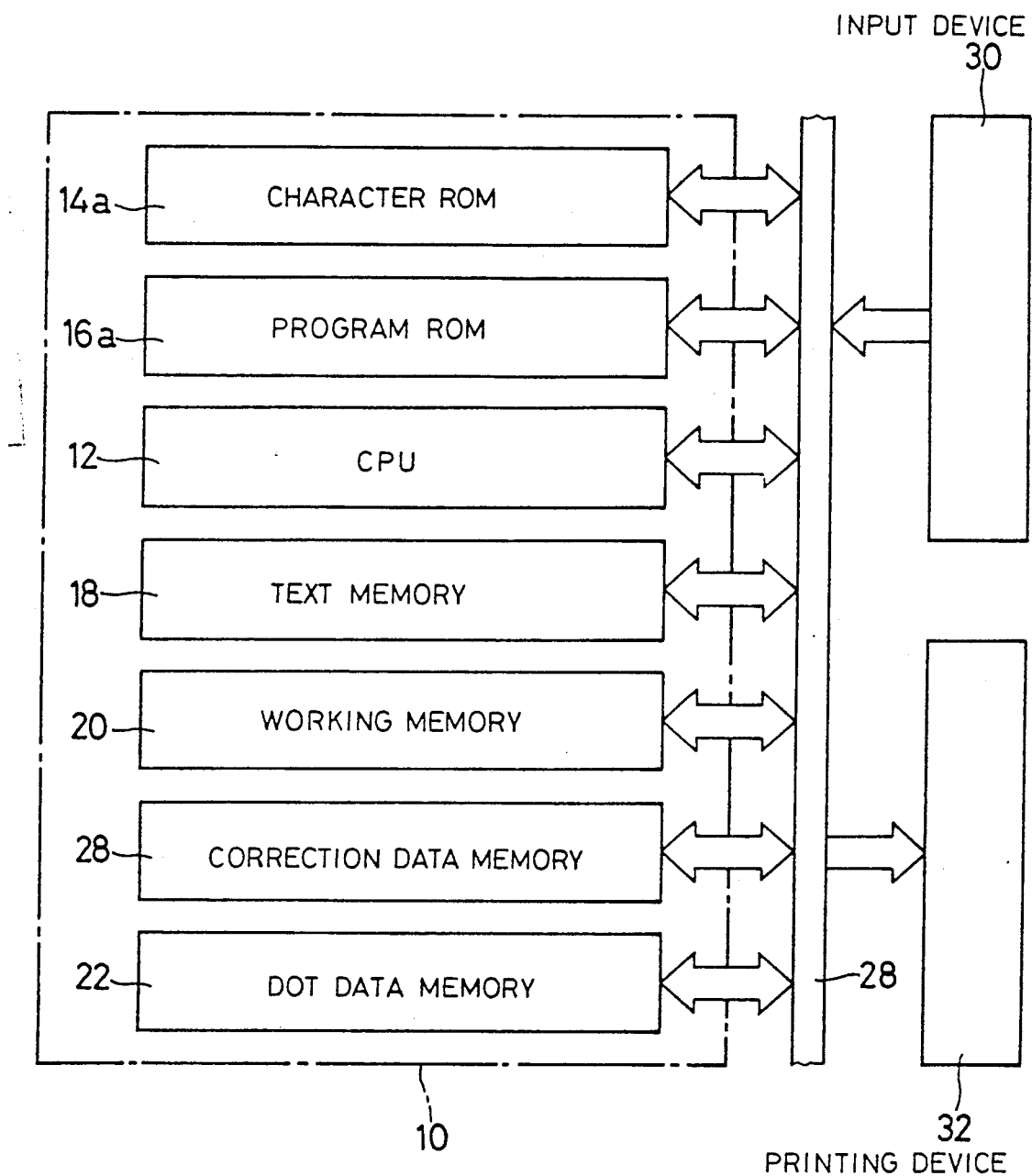

Referring next to FIGS. 15 and 16, there will be described a second embodiment of the data converting apparatus of the present invention, as also applied to a laser printer. For easy understanding, the same reference numerals as used in the first embodiment will be used to identify the corresponding components in this second embodiment. In the interest of brevity, only the aspects of the second embodiment different from the first embodiment will be described.

The microcomputer 10 used in this second embodiment does not include the OUTLINE WIDTH, REPRODUCTION WIDTH and DESIGNATION NUMBER memories 24, 26 and 27 provided in the first embodiment, but includes a CORRECTION DATA memory 28, as shown in FIG. 15. The CPU 12 includes the data reading portion 36, a width correcting portion 38a and a dot data preparing portion 40a, as shown in FIG. 16.

The CORRECTION DATA memory 28 is provided to store width correction data prepared by the width correcting portion 38a, which are necessary to correct the reproduction width of a stroke of a character, as described below.

A CHARACTER ROM 14a used in the present embodiment stores not only the character outline data as described above with respect to the first embodiment, but also nominal width data which are indicative of the strokes of each character whose widths are to be controlled to the nominal values, and the nominal widths of these strokes. As shown in FIG. 18 which shows the outline of letter "H" by way of example, each character consists of at least one stroke 44, each of which has a width defined by two segments 46 of the outline of the character represented by the outline data, and a length defined by the other segments 46. The segments 46 defining the strokes 44 collectively define the outline of the entire character.

The nominal width data are provided for each of the strokes of the characters whose widths are required to be controlled to the nominal values. There will be described the two sets of nominal width data, one set for the two vertical strokes 44 of the letter "H" of FIG. 18 parallel to the Y axis, and the other set for the horizontal stroke 44 of the same letter parallel to the X axis. As illustrated in FIG. 19(a), the set of nominal width data for the vertical strokes 44 represent number NL of the vertical strokes and two pairs of x-axis coordinate values, which represent the respective two pairs of the vertical segments 46 defining the widths of the respective vertical strokes 44. Thus, the two vertical strokes 44 and their nominal widths are designated. The x-axis coordinate values are stored from the smallest to the largest. The set of nominal width data for the horizontal stroke 44 is illustrated in FIG. 19(b). This set of data represent number NW of the horizontal stroke 44, and a pair of y-axis coordinate values which represent the respective two horizontal segments 46 defining the width of the horizontal stroke 44. The y-axis coordinate values are also stored from the smallest to the largest.

The outline of the letter "H" superimposed on the pixel screen 52 is shown in FIG. 20. As in the first embodiment, each character is represented by a 20×20 matrix of picture elements where the selected character size is 4.8 point. As described before, the number of the dot-forming picture elements along a given x-axis pixel line x varies depending upon the position at which the letter "H" is printed. For example, where the number of the dot-forming picture elements which defines the nominal outline width as defined by the outline data is "4" as indicated by hatched circles in FIG. 21(a), only three image dots corresponding to three picture elements are actually formed according to the dot data prepared by conversion from the outline data, as indicated in FIG. 21(b). While a variation in the reproduction width does not significantly influence the appearance of the printed character where the selected character size is relatively large, the variation may be undesirably perceived where the character size is relatively small. In FIGS. 21(a) and 21(b), the centers of the picture elements are indicated by "x" marks.

In view of the above, the present embodiment is adapted to correct or change the outline data of a character if the reproduction width of a stroke of the character is different from the nominal value, when the selected character size is 12 point or smaller. The dot data are prepared based on the corrected outline data, so that the character stroke is printed with the nominal width.

A PROGRAM ROM 16a used in the present embodiment stores various control programs including a data conversion routine as illustrated in the flow chart of FIG. 17. The operation of the laser printer according to this second embodiment will be described referring to FIG. 17, particularly in connection with the letter "H" of FIG. 18.

Initially, step S101 is executed to read the character outline data representative of the character "H", nominal width data and character size data. Step S101 is followed by step S102 to determine whether or not the selected character size is larger than 12-point size. Where the selected character size is 20-point, 24-point, 30-point or other size larger than 12-point size, an affirmative decision (YES) is obtained in step S102, and the control flow goes to step S103 to normally convert the outline data into corresponding dot data. In this case, the bits of the dot data corresponding to the picture elements whose centers lie within the outline of the relevant character as superimposed on the pixel screen 52 are set to "1" to form image dots at the positions of these picture elements. The prepared dot data are stored in the DOT DATA memory 22.

If the selected character size is 12-point or smaller, a negative decision (NO) is obtained in step S102, and the control flow goes to step S104 to determine whether the nominal width data stored in the CHARACTER ROM 14a include nominal width data for any vertical stroke of the relevant character, i.e., letter "H". In this specific example, nominal width data are stored for all vertical and horizontal strokes 44 of the letter "H". Accordingly, an affirmative decision is obtained in step S104, whereby step S104 is followed by step S105 in which the reproduction width of one of the two vertical strokes 44 which has the smaller x-axis coordinate values is calculated. More specifically, the two x-axis coordinate values designating the relevant vertical stroke 44 are the values in the 1000×1000 X-Y coordinate system of FIG. 18. These two x-axis coordinate values are converted into x-axis coordinate values on the pixel screen 52, based on the selected character size and the printing data also received from the input device 30. Based on the obtained two x-axis coordinate values of the pixel screen 52 of FIG. 20, the number dL of the dot-forming elements located between the obtained x-axis coordinates in the X-axis direction is calculated to determine the reproduction width of the vertical stroke 44. Then, step S106 is implemented to determine whether the calculated number dL is equal to nominal width number DL representative of the nominal width. This nominal width is calculated by first subtracting the smaller one of the two x-axis coordinate values of the two vertical segments 46 of the relevant vertical stroke 44, from the larger one of the two x-axis coordinate values, and then dividing the obtained difference by the value corresponding to the size of the picture elements in the 1000×1000 X-Y coordinate system of FIG. 18. In this example where the character size is 4.8 point, the difference is divided by the value "50" to calculate the reproduction width of the vertical stroke 44. If the obtained quotient includes any fraction, the quotient is rounded. For the vertical stroke 44 whose width is defined by the two vertical segments 46 having the x-axis coordinate values "200" and "340", "3" is obtained as the nominal width number DL.

If the reproduction width number dL is different from the nominal width number DL, step S107 is implemented to change the outline data of the character "H", more precisely, the outline data of the relevant vertical stroke 44, so that the number of the dot-forming picture elements which lie within the outline of the vertical stroke is equal to the nominal width number DL. The outline data of the relevant vertical stroke 44 are changed so as to move one of the two vertical segments 46 of the stroke 44 in the X-axis direction, so as to change the number of the dot-forming picture elements which lie within the outline as defined by the changed outline data. In this example, the vertical segment 46 having the smaller x-axis coordinate value is moved.

In step S106, a determination is first made as to whether the reproduction width (dL) is larger than the nominal width (DL) or not. If the reproduction width is larger than the nominal width, the vertical segment 46 having the smaller x-axis coordinate value is moved in the positive X-axis direction to increase the x-axis coordinate value, so that the reproduction width is reduced. If the reproduction width is smaller than the nominal width, the same vertical segment 46 is moved in the negative X-axis direction to decrease the x-axis coordinate value, so that the reproduction width is increased. If the nominal width number DL is "3" while the reproduction width number dL is "2" as indicated in FIG. 22(a), the relevant vertical segment 46 is moved by a suitable distance as indicated in one-dot chain line in FIG. 22(b), so that the centers (indicated by "x") of the three successive dot-forming picture elements 46 are located between the two vertical segments 46. The distance of movement is a minimum value necessary to obtain the reproduction width equal to the nominal width. This distance of movement is stored in the CORRECTION DATA memory 28, together with the original x-axis coordinate value of the relevant vertical segment 46.

After the correction data for one of the vertical strokes is completed, the control flow goes to step S108 to increment a count "n1", and step S9 to determine whether the count "n1" becomes equal to the number NL, namely, to determine whether the reproduction widths of all the vertical strokes designated by the nominal width data have been checked. In this specific case where the count "n1" is equal to "1", a negative decision (NO) is obtained in step S109 since the number NL is "2". The control flow therefore goes back to step S105, to change the outline data of the other vertical stroke 44 if necessary, in the same manner as described above.

If the reproduction width of the relevant vertical stroke 44 is equal to the nominal width, an affirmative decision (YES) is obtained in step S106, and the outline data are not changed in step S107. In this case, step S106 is directly followed by step S108.

After the count "n1" becomes equal to the number NL, i.e., "2", an affirmative decision (YES) is obtained in step S109, and the control flow goes to step S110 to determine whether the nominal width data stored in the CHARACTER ROM 14a include nominal width data for any horizontal stroke of the relevant character, i.e., letter "H". In this specific example, nominal width data are stored for the horizontal stroke 44 of the letter "H". Accordingly, an affirmative decision is obtained in step S110, whereby steps S111–S115 are executed. Namely, the two y-axis coordinate values designating the relevant horizontal stroke 44 are the values in the 1000×1000 X-Y coordinate system of FIG. 18. These two y-axis coordinate values are converted in step S111 into y-axis coordinate values on the pixel screen 52, based on the selected character size and the printing data. Based on the obtained two y-axis coordinate values of the pixel screen 52 of FIG. 20, the number dW of the dot-forming elements located between the obtained y-axis coordinates in the Y-axis direction is calculated to determine the reproduction width of the horizontal stroke 44. Then, step S111 is followed by step S112 to determine whether the calculated number dW is equal to nominal width number DW representative of the nominal width. This nominal width is calculated by first obtaining a difference between the two y-axis coordinate values, and then dividing the obtained difference by the value "50" corresponding to the size of the picture elements in the 1000×1000 X-Y coordinate system of FIG. 18. For the horizontal stroke 44 whose width is defined by the two horizontal segments 46 having the y-axis coordinate values "510" and "630", "2" is obtained as the nominal width number DW.

If the reproduction width number dW is different from the nominal width number DW, step S113 is implemented to change the outline data of the relevant horizontal stroke 44, so that the number of the dot-forming picture elements which lie within the outline of the horizontal stroke is equal to the nominal width number DW. The outline data of the relevant horizontal stroke 44 are changed so as to move in the Y-axis direction one of the horizontal segments 46 which has the smaller y-axis coordinate value. If the reproduction width number dW is "3" is indicated in FIG. 23(a), the relevant horizontal segment 46 is moved by a suitable distance as indicated in one-dot chain line in FIG. 23(b), so as to reduce the number of the dot-forming picture elements. The minimum distance of movement necessary to obtain the reproduction width equal to the nominal width is stored in the CORRECTION DATA memory 28, together with the original y-axis coordinate value of the relevant horizontal segment 46.

Since the character "H" has only one horizontal stroke 44, an affirmative decision (YES) is obtained in step S115 after execution of step S114 to increment a count "n2". Then, the control flow goes to step S116 in which the counts "n1" and "n2" are reset to zero. Step S116 is followed by step S103 in which the dot data of the character "H" are prepared based on the original outline data, and the correction data stored in the CORRECTION DATA memory 28 in steps S107 and S113. The dot data bits are set to "1" according to the corrected outline of the character "H" as superimposed on the pixel screen 52. The corrected outline is calculated based on the x-axis and y-axis coordinate values of the vertical and horizontal segments 46 which are are moved to adjust the reproduction widths of the vertical and horizontal strokes 44 by the distances stored in the memory 28.

If a character has no vertical strokes, or if the data converting apparatus is adapted to correct only the reproduction width of only the horizontal strokes, a negative decision (NO) is obtained in step S104, whereby steps S105–S109 are skipped, and steps S111–S115 are implemented after an affirmative decision (YES) is obtained in step S110.

If a character has no horizontal strokes, or if the data converting apparatus is adapted to correct only the reproduction width of only the vertical strokes, an affirmative decision (YES) is obtained in step S104, whereby steps S105–S109 are executed. In this case, a negative decision (NO) is obtained in step S110, and steps S111–S115 are skipped.

If the nominal width data are not set for any stroke of a character, a negative decision (NO) is obtained in both step S104 and step S110, and the counts "n1" and "n2" are reset to zero. In this case, the outline data of the character are normally converted into corresponding dot data.

It will be understood from the above description of this second embodiment of the invention that the original outline data if a character are changed or corrected so that the reproduction width of each designated stroke of the character coincides with the nominal width defined by the original outline data, to permit a good appearance of the character to be reproduced according to the dot data prepared from the changed outline data. Since the nominal width of a stroke used to change the outline data to correct the reproduction width of the stroke is calculated based on the coordinate values of the segments defining the outline of the stroke, only the nominal width data stored in the CHARACTER ROM 14a are required in addition to the character outline data. Thus, the overall memory capacity required for effecting the correction of the reproduction width is comparatively small.

It will also be understood that the portion of the PROGRAM ROM 16 assigned to execute step S103 and the portion of the dot data preparing portion 40a of the CPU 12 assigned to execute step S103 constitute dot data preparing means for preparing dot data corresponding to the outline data of a character, and the CHARACTER ROM 14a constitute memory means for storing the nominal width data for desired strokes of the character. Further, the portion of the PROGRAM ROM 16a assigned to execute steps S104–S116 and the width correcting portion 38a of the CPU 12 constitute data changing means for changing the outline data so as to move a segment of the outline of the relevant stroke of the character.

While the second embodiment has been described in connection with the correction of the reproduction width of the vertical and horizontal strokes of a character which are parallel to the Y and X axes of the coordinated pixel screen 52, the principle of the invention is applicable to any curved strokes, or straight strokes inclined with respect to the X and Y axes. In this case, the data converting apparatus is adapted to execute a data conversion routine different from that illustrated in FIG. 17. The reproduction width of such inclined or curved strokes may be corrected by moving one of segments defining the outline of the relevant stroke, as in the illustrated example of the vertical and horizontal strokes. In this case, each inclined stroke is treated as a vertical or horizontal stroke, depending upon the angle of inclination. It is, also possible that the reproduction widths of an inclined stroke as measured along the x-axis or y-axis pixel lines x, y which intersect the outline of the stroke are calculated and compared with the nominal width, and the reproduction width of the inclined stroke is corrected so that the ratio of the reproduction widths equal to the nominal width is higher than a predetermined lower limit. A curved stroke may be divided into a plurality of segments, each of which is treated as a vertical, horizontal or inclined line for the purpose of correcting the reproduction width.

In the above second embodiment, the nominal width (nominal width number DL, DW) is calculated in step S106, S112, namely, when a decision is made as to whether the correction of the reproduction width is required or not. However, the calculation of the nominal width based on the outline data and the selected character size can be made after a negative decision (NO) is obtained in step S102, and before step S106 or S112 is executed, so that the calculated nominal width is read when the determination in step S106, S112 is effected.

The nominal width data stored in the CHARACTER ROM 14a may consist of stroke-designating data indicative of each stroke whose reproduction width is controlled to the nominal width, and number data representative of the number of the dot-forming picture elements corresponding to the nominal width of the stroke. In this case, the number data are stored for each of the character sizes (smaller than 12-point size).

In the illustrated example of the letter "H" having two vertical strokes 44 each of which is defined by two vertical segments 46, one of the two vertical segments 46 which has the smaller x-axis coordinate value is moved for both of the two vertical strokes. However, one of the two vertical segments 46 is moved for one of the two vertical strokes 44, while the other vertical segment 46 is moved for the other vertical stoke 44. This modification is also applicable to a plurality of horizontal strokes. Further, both of the two segments defining the width of each stroke may be moved so as to increase or decrease the reproduction width. It is also possible to calculate a distance of movements of each of the two segments necessary to obtain the desired reproduction width, and move only one of the segments whose distance of movement is smaller. If the difference between the reproduction width and the nominal width of a stroke corresponds to two or more picture elements, the two segments may be moved. Also, the two segments may be moved in the same direction so that the reproduction width coincides with the nominal width.

Where a character has a plurality of vertical and horizontal strokes, only the selected one or ones of the strokes may be checked for correction of the reproduction width. Further, the correction of the reproduction width may be made even when the 12-point or larger character size is selected.

In the second embodiment, the nominal width data which represent the strokes of characters whose width is controlled to the nominal width, and the nominal widths of these strokes are manually prepared by a manufacturer of the apparatus, for example, and stored in the CHARACTER ROM 14a before the data converting apparatus is delivered to the user. However, the apparatus according to the second embodiment may be modified such that the nominal width data are automatically prepared for each character, based on the outline data of the character, when the apparatus is operated. An example of such modified apparatus will be described as the third embodiment of the invention, referring to FIGS. 24–32.

Figure 24:
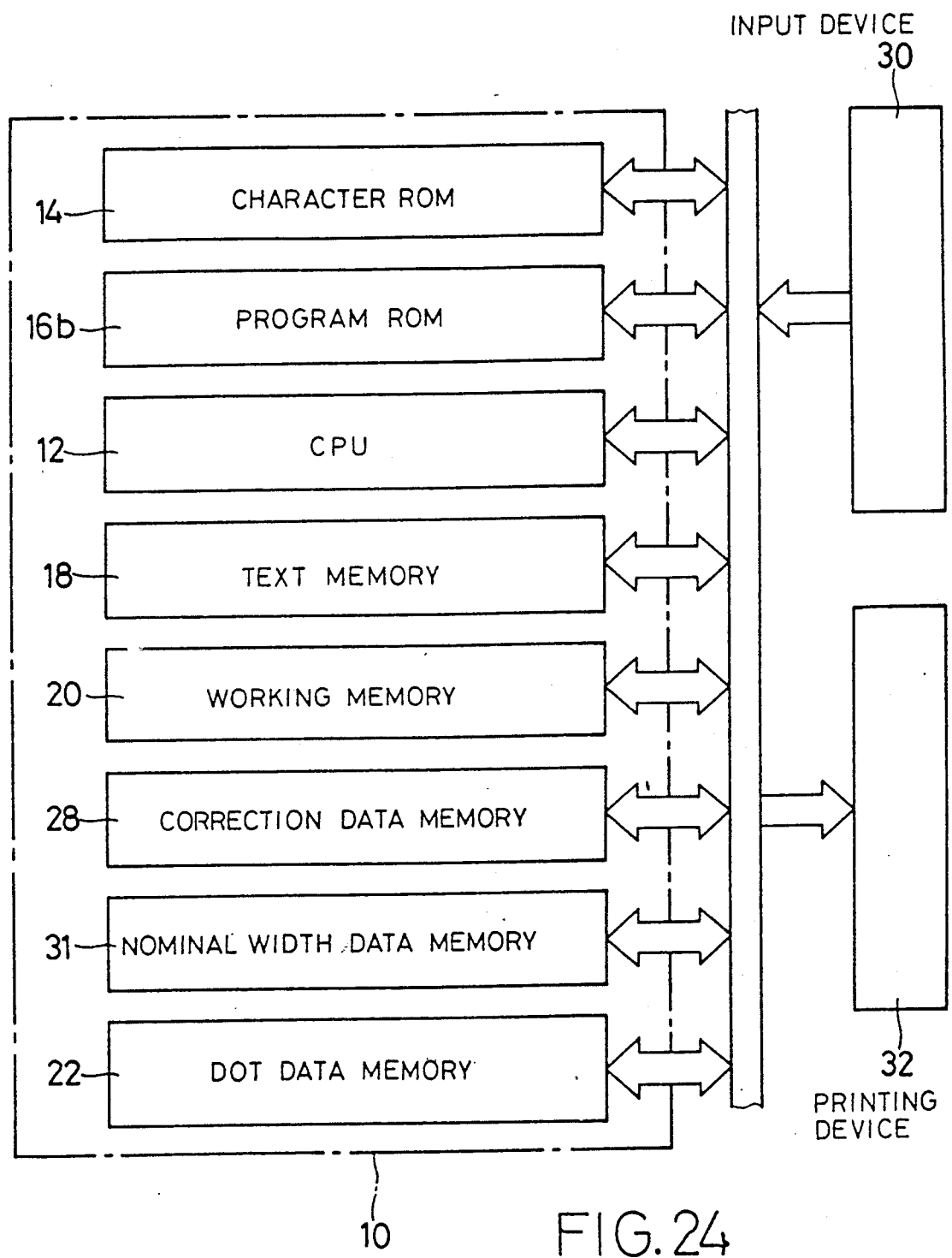
FIGS. 24 and 25 are views corresponding to those of FIGS. 1 and 2, showing a third embodiment of the invention.
Figure 25:
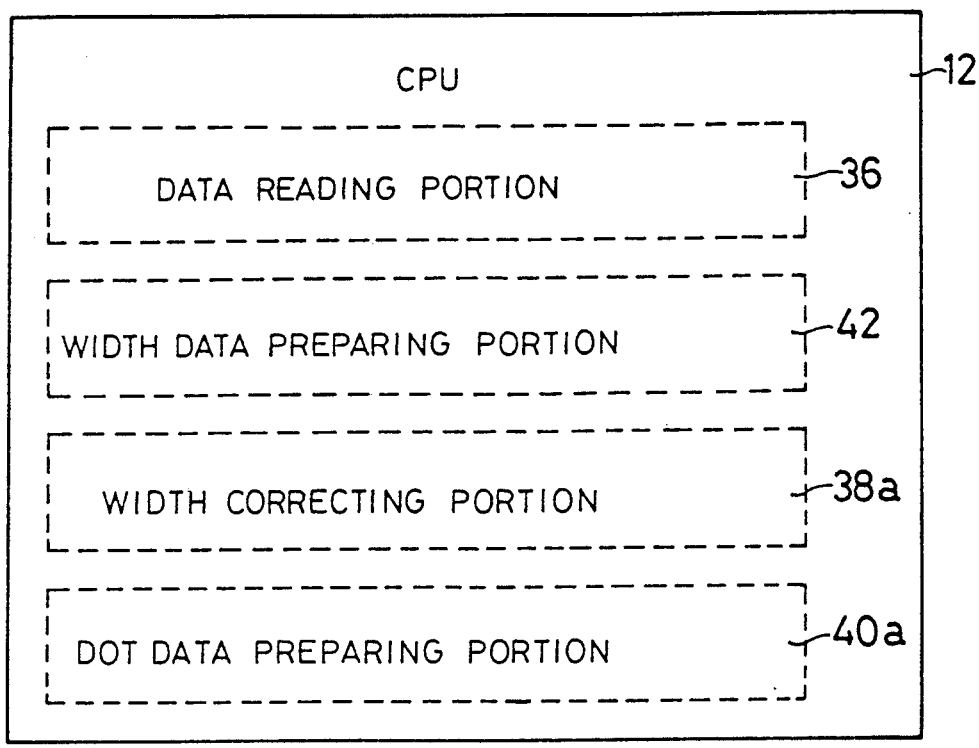
Figure 31:
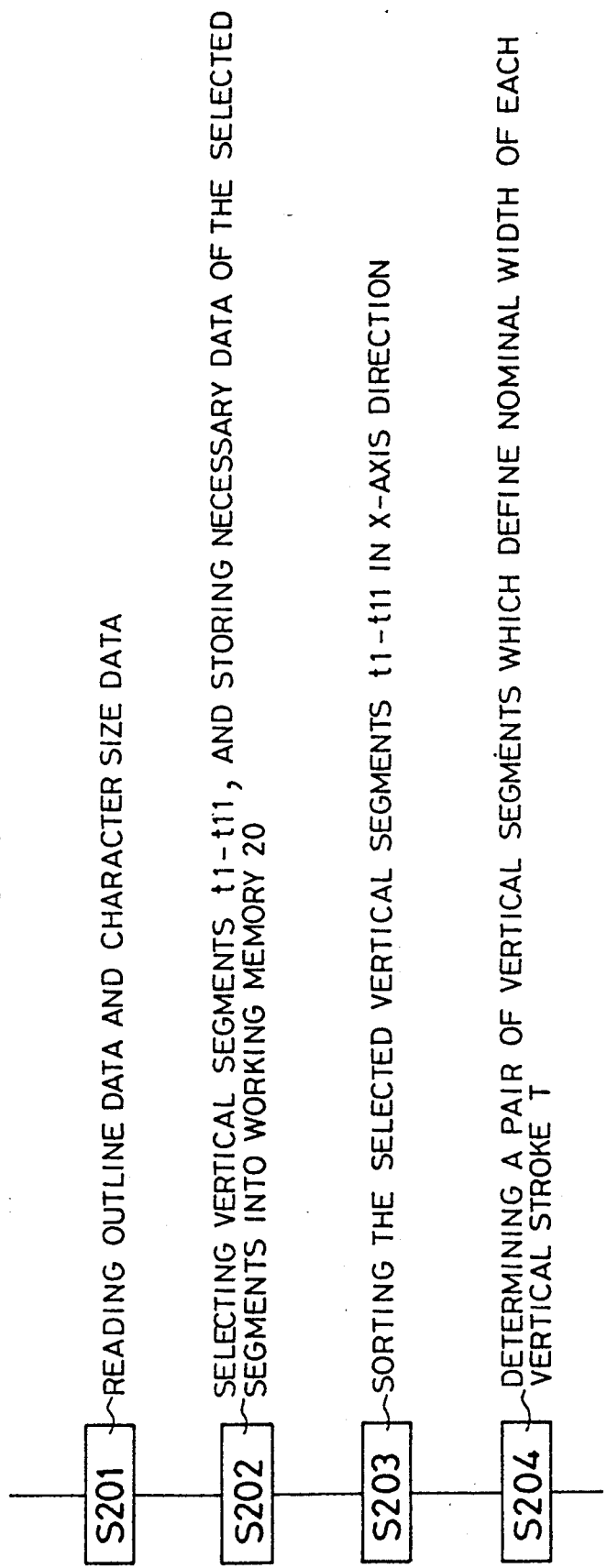
FIGS. 31 and 32 are flow charts showing an operation of the third embodiment.
Figure 32:
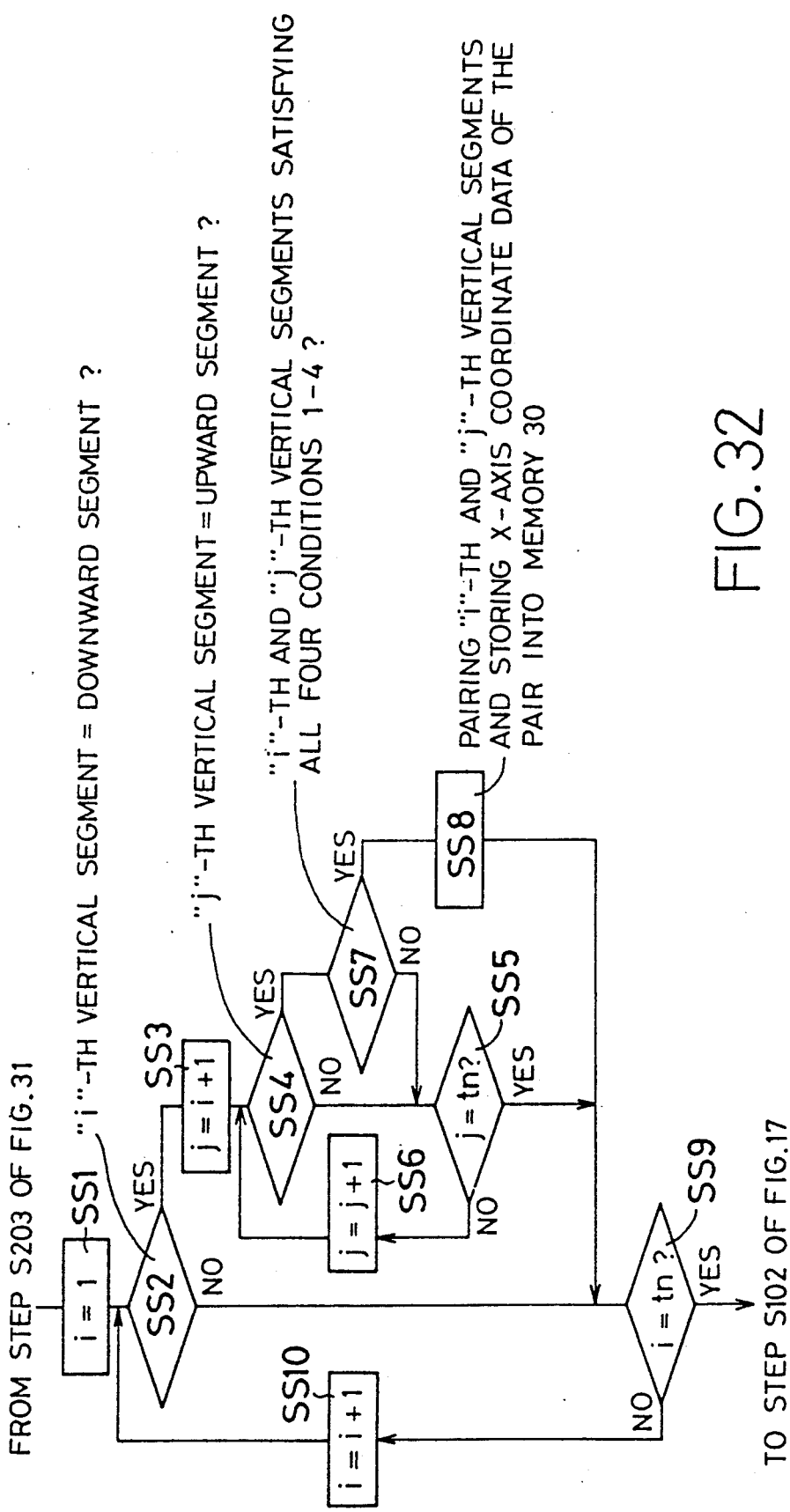

In this third embodiment, the CHARACTER ROM 14 does not store the nominal width data, and the microcomputer 10 includes a NOMINAL WIDTH DATA memory 31 for storing the nominal width data, as indicated in FIG. 24. The microcomputer 10 uses a PROGRAM ROM 16b which stores various control programs including a control program for executing a routine as illustrated in FIG. 31. As shown in FIG. 25, the CPU 12 includes a width data preparing portion 42 for preparing the nominal width data, as described below in detail. The prepared nominal width data are stored in the NOMINAL WIDTH DATA memory 31. The width correcting portion 38a changes the outline data, based on the nominal width data stored in the memory 31 and the width correction data stored in the CORRECTION DATA memory 28. In the other aspects the third embodiment is identical with the preceding second embodiment.

As indicated above, the third embodiment is characterized by the nominal width preparing portion 42 for automatically preparing the nominal width data based on the character outline data read out from the CHARACTER ROM 14 by the data reading portion 36. This aspect of the third embodiment will be described with respect to letter "F" whose outline is superimposed on the X-Y coordinate system, as shown in FIG. 26.

Figure 27:
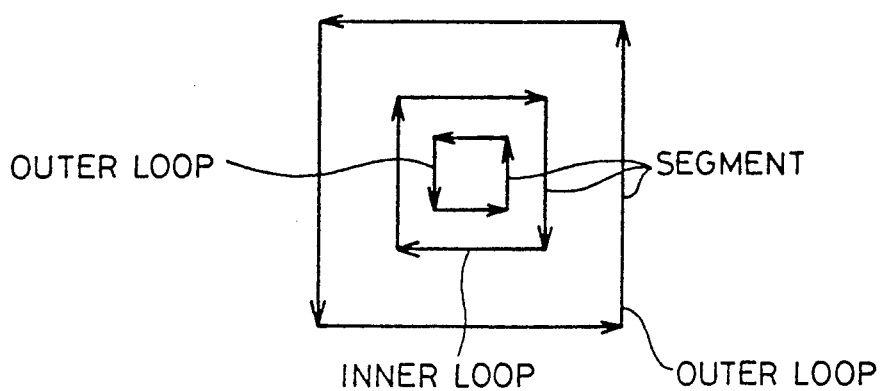
Figure 26:
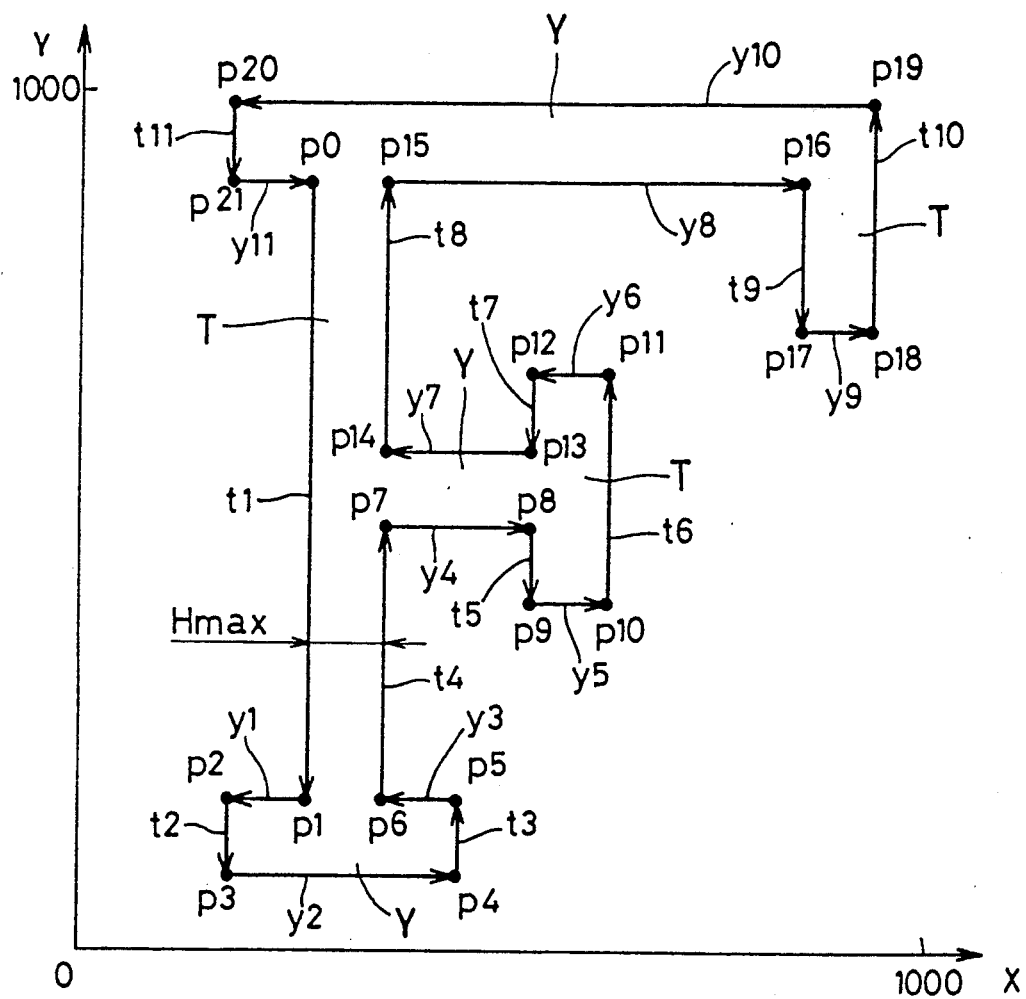

As indicated in FIG. 26, the letter "F" has three vertical strokes T and three horizontal strokes Y. The nominal outline width of each of the vertical strokes T is defined by appropriate two vertical segments selected from t1–t11, and the nominal outline width of each of the horizontal strokes Y is defined by appropriate two horizontal segments selected from y1–y11. Similarly, the nominal length of each vertical or horizontal stroke T, Y is defined by appropriate two horizontal or vertical segments selected from the segments y1–y11, t1–t11. These segments t1–t11 and y1–y11 cooperate to define the outline of the letter "F", which is defined by the character data stored in the CHARACTER ROM 14. The segments of the outline of each character form at least one closed loop. For example, the segments of the outline of the letter "F" form only one closed loop, while the segments of the outline of letter "D" form two closed loop, i.e., an outer loop and an inner loop which cooperate to define an imaged area therebetween. Where the outline of a character has two or more closed loops, the loop defining the periphery of the character is referred to as an "outer loop", and the loop surrounded by the outer loop is referred to as an "inner loop". Further, the loop surrounded by the inner loop is also referred to as an "outer loop". Thus, the outer and inner loops are alternately positioned in the inward direction with respect to each other, as indicated in FIG. 27. Each segment (t1–t11, y1–y11) of the character outline has a direction, as indicated by arrow in FIG. 26, whereby each of the closed loops formed by the segments has a direction. For the sake of explanation, it is assumed that the outer loops have a counter-clockwise direction while the inner loops have a clockwise direction, as indicated in FIGS. 26 and 27.

The nominal width data for the vertical strokes T and the nominal width data for the horizontal strokes Y are prepared independently of each other, by the width data preparing portion 42. The nominal width data for the vertical strokes T are prepared as illustrated in the flow chart of FIG. 31.

Initially, step S201 is executed to read out the outline data representative of the letter "F" from the CHARACTER ROM 14, and the character size data. Then, the control flow goes to step S202 to select the vertical segments t1–t11 parallel to the Y axis, from the segments of the character "F" represented by the outline data. Then, the width data preparing portion 42 of the CPU 12 stores in the WORKING memory 20 segment data which represent the x-axis coordinates of the selected segments t1–t11, y-axis coordinates of the start and end points of each selected segment, identification number of the loop to which each selected segment belongs, and the kind of the loops (either outer loop or inner loop)

Step S202 is followed by step S203 in which the selected vertical segments t1–t11 are sorted in the X-axis direction. The sorted vertical segments t1–t11 and the associated segment data thereof are indicated in Table 1 below:

TABLE 1

| No. | 1 | 2 | 3 | 4 | 5 | 6 | 7 | 8 | 9 | 10 | 11 |
|---|---|---|---|---|---|---|---|---|---|---|---|
| Segments | t2 | t11 | t1 | t4 | t8 | t3 | t5 | t7 | t6 | t9 | t10 |
| X-Coordinate | 2x | 2x | 0x | 6x | 6x | 4x | 8x | 8x | 10x | 16x | 18x |
| Y-Coordinates | | | | | | | | | | | |
| Start | 2y | 20y | 0y | 6y | 14y | 4y | 8y | 12y | 10y | 16y | 18y |
| End | 3y | 21y | 1y | 7y | 15y | 5y | 9y | 13y | 11y | 17y | 19y |
| Direction | DW | DW | DW | UP | UP | UP | DW | DW | UP | DW | UP |
| Loop No. | | | | | | 1 | | | | | |
| Loop Kind | | | | | | Outer Loop | | | | | |

The stored vertical segments t1–t11 are paired in step S204. That is, each of the vertical strokes T is identified by an appropriate pair which is selected from the vertical segments t1–t11, according to a predetermined rule, so that the two segments of each pair have the opposite directions (upward and downward directions as indicated at UP and DW in Table 1). The predetermined rule consists of the following four conditions:

Condition 1:
One of the y-axis coordinate values of the start and end points of one of the two vertical segments of each pair is intermediate between one of the y-axis coordinate values of the start and end point of the other of the two vertical segments. Namely, the two vertical segments are at least partially overlapped by each other, as indicated in FIG. 28.

Condition 2:
Both of the two vertical segments of each pair should not belong to the outer loop or loops, where the two vertical segments do not belong to the same loop. According to this condition, a pair of two vertical segments as illustrated in FIG. 29 is excluded.

The following pairs of the vertical segments t1–t11 of the letter "F" of FIG. 26 satisfy the above two Conditions 1 and 2:

T11–t10: t1–t4 (t8): t2–t3: t5–t6: t7–t6: and t9–t10

If it is assumed that there exists only one vertical upward segment for each vertical downward segment to form a pair, the vertical downward segment t1 should be paired with either the vertical upward segment t4 or the vertical upward segment t8.

The nominal width data for the vertical segments t1–t11 to be prepared represent a pair of x-axis coordinates of a pair of vertical segments which define the nominal width of each vertical stroke, and at the same time designate or identify the vertical stroke per se. In this respect, the following Condition 3 should be satisfied.

Condition 3:
If a first pair of two vertical segments has been already determined, a second pair of two vertical segments one of which has the same x-axis coordinate value as that of one of the first pair is excluded. For example, the pair of vertical segments t7–t6 is excluded since the pair of vertical segments t5–t6 has been already determined.

It is noted that a difference between the nominal width of a stroke defined by the outline data and the reproduction width of the stroke as reproduced according to the corresponding dot data will not significantly deteriorate the appearance of the stroke when reproduced, if the nominal width of the stroke is relatively large. In this case, therefore, the outline data to eliminate the difference is not effected in the present embodiment. For this purpose, the following Condition 4 should be satisfied:

Condition 4:
A pair of two vertical segments having x-axis coordinate values whose difference exceeds a maximum nominal width Hmax is excluded. Further, if there exist two or more pairs each pair including the same vertical segment, these two or more pairs are excluded, except for the pair which define the smallest nominal width.

In an example of FIG. 30, a first pair of vertical segments t1–t4 defines a nominal width h1 smaller than the maximum width Hmax, and a second pair of vertical segments t2–t4 defines a nominal width h2 also smaller than the maximum width Hmax. However, a third pair of vertical segments t3–t4 defines a nominal width h3 which is larger than the maximum width Hmax. According to the Condition 4, the second and third pairs are excluded, and only the first pair is determined as a pair which defines the nominal width of the relevant stroke.

Eventually, the segments t1 and t4 (t8), the segments t5 and t6, and the segments t9 and t10 are selected from the vertical segments t1–t11 of the letter "F", as the pairs which satisfy the above four Conditions 1, 2, 3 and 4 and which define the nominal widths of the three vertical strokes T.

The nominal width data for the horizontal strokes Y may be prepared in the same manner as described above with respect to the vertical strokes T.

The x-axis and y-axis coordinate values of the thus selected pairs of vertical and horizontal segments are stored in the NOMINAL WIDTH DATA memory 31.

Steps S201–S204 of the flow chart of FIG. 31 are executed, for example, in place of step S101 of the flow chart of FIG. 17. Referring to the flow chart of FIG. 32, the operation in step S204 will be described in detail.

Initially, step SS1 is executed to set a count "i" to "1", and step SS2 is implemented to determine whether the "i"-th vertical segment (e.g., first vertical segment) is a downward segment or not. If the "i"-th vertical segment is a downward segment, step SS2 is followed by step SS3 to increment a count "j" which is larger by "1" than the current count "i". Then, the control flow goes to step SS4 to determine whether the "j"-th vertical segment (e.g., second vertical segment) is an upward segment or not. If the "j"-th vertical segment is a downward segment, a negative decision (NO) is obtained in step SS4, and step SS5 is executed to determine whether the count "j" is equal to "tn" or not. In an initial period of operation, a negative decision (NO) is obtained in step SS5, and step SS5 is followed by step SS6 to increment the count "j". Then, the control flow returns to step SS4 to determine whether the "j"-th vertical segment (e.g., third vertical segment) is an upward segment.

If the "j"-th vertical segment, for example, the third vertical segment, is an upward segment, an affirmative decision (YES) is obtained in step SS4, and the control flow goes to step SS7 to determine whether the "i"-th and "j"-th vertical segments (first and third vertical segments) satisfy all of the four Conditions 1-4, or not. If the Conditions 1-4 are satisfied, the control flow goes to step SS8 in which the "i"-th and "j"-th vertical segments are paired, and the x-axis coordinates of these segments are stored in the NOMINAL WIDTH memory 31. Then, step SS9 is implemented to determine whether the count "i" becomes equal to "tn", and step SS10 is implemented to increment the count "i" if a negative decision (NO) is obtained in step SS9. The control flow then returns to step SS2 to determine whether the next or "i"-th vertical segment is a downward segment, or not. Thus, steps SS2-SS10 are repeated until the count "i" becomes equal to "tn". Thus, the three pairs of vertical downward and upward segments t1-t4 (t8), t5-t6 and t9-t10 are determined, in the example of the letter "F". When an affirmative decision (YES) is obtained in step SS9, the control flow goes to step S102 of the data conversion routine of FIG. 17.

It will be understood that the present invention may certainly apply to a printer other than a laser printer, and may generally apply to a device other than a printer, which requires conversion of outline data of letters, symbols and other characters or visible representations into corresponding dot data.

It will also be understood that the present invention may be embodied with various other changes, modifications and improvements, which may occur to those skilled in the art.

What is claimed is:

1. A data converting apparatus for converting a batch of outline data representative of only an outline of a character having at least one stroke, into a batch of dot data which includes dot-forming bits each indicative of the presence of an image dot to be formed at a position of a corresponding dot-forming picture element which lies within the outline of each of said at least one stroke so as to satisfy a predetermined requirement, when said outline of said character is superimposed on a coordinated pixel screen wherein picture elements are defined by a plurality of parallel x-axis pixel lines and a plurality of parallel y-axis pixel lines perpendicular to said x-axis pixel lines, wherein the improvement comprises:

determining means for determining whether or not a difference between an outline width of said each stroke of the character as defined by said outline data and a reproduction width of said each stoke as reproduced according to said dot data as normally prepared based on said outline data exceeds a predetermined reference value; and data changing means for changing the normally prepared dot data so as to reduce said difference between said outline and reproduction widths, if said determining means determines that said difference exceeds said reference value, and wherein said determining means includes (a) first calculating means for calculating as said outline width a distance between coordinates of a pair of intersections between two segments of said outline of said each stroke and each of at least one of said plurality of parallel x-axis pixel lines and said plurality of parallel y-axis pixel lines of said coordinated pixel screen, based on the outline data representative of said two segments as superimposed on said coordinated pixel screen, and (b) second calculating means for calculating as said reproduction width the number of said dot-forming bits which correspond to the successive dot-forming picture elements which lie within said distance between said two segments so as to satisfy said predetermined requirement, said second calculating means calculating said number based on said coordinates of said pair of intersections on said coordinated pixel screen which are calculated by said first calculating means.

2. The data converting apparatus according to claim 1, wherein said data changing means includes width correcting means for effecting at least one of a first data changing operation to increase the number of said dot-forming bits corresponding to an array of said successive dot-forming picture elements which defines said reproduction width, if the number corresponding to said distance between said two segments is larger than said number of said dot-forming bits, and a second data changing operation to decrease the number of said dot-forming bits, if said number of said dot-forming bits is larger than said number corresponding to said distance.

3. The data converting means according to claim 2, wherein said width correcting means includes means for calculating designation numbers which designate two outermost picture elements located at opposite ends of said array of said successive dot-forming picture elements, based on said number of said dot-forming bits.

4. The data converting means according to claim 3, further comprising dot data preparing means for preparing said dot data representative of said each stroke, based on said designation numbers.

5. A data converting apparatus for converting a batch of outline data representative of an outline of a character having at least one stroke, into a batch of dot data which includes dot-forming bits each indicative of the presence of an image dot to be formed at a position of a corresponding dot-forming picture element which lies within the outline of each of said at least one stroke so as to satisfy a predetermined requirement, when said outline of said character is superimposed on a coordinated pixel screen wherein picture elements are defined by a plurality of parallel x-axis pixel lines and a plurality of parallel y-axis pixel lines perpendicular to said x-axis pixel lines, wherein the improvement comprises:

determining means for determining whether or not a difference between an outline width of said each stroke of the character as defined by said outline data and a reproduction width of said each stroke as reproduced according to said dot data as normally prepared based on said outline data exceeds a predetermined reference value; and data changing means for changing the normally prepared dot data so as to reduce said difference between said outline and reproduction widths, if said determining means determines that said difference exceeds said reference value, and wherein said determining means includes memory means for storing nominal width data which is indicative of at least one designated stroke of said at least one stroke of said character and which is representative of a nominal width as said outline width of each of said at least one designated stroke, and further includes means for calculating as said reproduction width the number of the successive dot-forming picture elements located between two segments of the outline of said each designated stroke which define said nominal width, said determining means determining that said difference exceeds said reference value if the calculated number of said dot-forming picture elements is different from the number which corresponds to said nominal width represented by said nominal width data.

6. The data converting apparatus according to claim 5, wherein if said determining means determines that said calculated number of said dot-forming picture elements is different from said number corresponding to said nominal width, said data changing means changes said outline data of said character so as to move at least one of said two segments of said each designated stroke, relative to said pixel screen, a direction and an amount of movement of said at least one of said two segments being determined so that said calculated number of the dot-forming picture elements is equal to said number corresponding to said nominal width.

7. The data converting apparatus according to calim 5, wherein said data changing means includes width correcting means for effecting at least one of a first data changing operation to increase the number of said successive dot-forming picture elements which defines said reproduction width, if the number corresponding to said nominal width represented by said nominal width data is larger than said number of said successive dot-forming picture elements, and a second data changing operation to decrease the number of said successive dot-forming picture elements, if said number of said successive dot-forming picture elements is larger than said number corresponding to said nominal width.

8. The data converting apparatus according to claim 7, wherein said width correcting means includes means for calculating designation numbers which designate two outermost picture elements located at opposite ends of an array of said successive dot-forming picture elements, based on said number of said successive dot-forming picture elements.

9. The data converting means according to claim 8, further comprising dot data preparing means for preparing said dot data representative of said of each stroke, based on said designation numbers.

10. The data converting apparatus according to claim 5, wherein said memory means stores said outline data as well as said nominal width data.

11. The data converting apparatus according to claim 10, wherein said memory means consists of a read-only memory.

12. The data converting apparatus according to claim 5, further comprising means for determining whether or not a selected size of said character is smaller than a predetermined value, said determining means being activated if said selected size is smaller than said predetermined value, said determining means being inhibited from operating if said selected size is not smaller than said predetermined value.

13. A data converting apparatus for converting a batch of outline data representative of an outline of a character having at least one stroke, into a batch of dot data which includes dot-forming bits each indicative of the presence of an image dot to be formed at a position of a corresponding dot-forming picture element which lies within the outline of each of said at least one stroke so as to satisfy a predetermined requirement, when said outline of said character is superimposed on a coordinated pixel screen wherein picture elements are defined by a plurality of parallel x-axis pixel lines and a plurality of parallel y-axis pixel lines perpendicular to said x-axis pixel lines, wherein the improvement comprises:

determining means for determining whether or not a difference between an outline width of said each stroke of the character as defined by said outline data and a reproduction width of said each stroke as reproduced according to said dot data as normally prepared based on said outline data exceeds a predetermined reference value;

said determining means including memory means for storing manual width data which is indicative of at least one designated width data of said at least one stroke of said character and which is representative of a nominal width as said outline width of each of said at least one designated stroke, said determining means further including means for calculating as said reproduction width the number of the successive dot-forming picture elements located between two segments of the outline of said each designated stroke which define said nominal width, said determining means determining that said difference exceeds said reference value if the calculated number of said dot-forming picture elements is differenct from the number which corresponds to said nominal width represented by said nominal width data, data changing means for changing the normally prepared dot data so as to reduce said difference between said outline and reproduction widths, if said determining means determines that said difference exceeds said reference value;

selecting means for selecting a pair of two segments of said outline of said each stroke which define the nominal width of said each stroke, from a plurality of segments which define said outline of the character, based on said outline data; and calculating means for calculating said nominal width of said each stroke, based on the outline data representative of said pair of two segments selected by said selecting means, and storing the calculated nominal width into said memory means, as said nominal width data.

14. The data converting apparatus according to claim 13, wherein said selecting means selects said pair of two segments of said outline of said each stroke, from the segments which define the nominal width smaller than a predetermined value.

* * * * *